US007321589B2

(12) United States Patent
Lohr et al.

(10) Patent No.: US 7,321,589 B2
(45) Date of Patent: Jan. 22, 2008

(54) MAC LAYER RECONFIGURATION IN A MOBILE COMMUNICATION SYSTEM

(75) Inventors: Joachim Lohr, Darmstadt (DE); Dragan Petrovic, Darmstadt (DE); Eiko Seidel, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/496,743

(22) Filed: Aug. 1, 2006

(65) Prior Publication Data
US 2007/0047452 A1    Mar. 1, 2007

(30) Foreign Application Priority Data
Aug. 16, 2005  (EP)  ................................. 05017777

(51) Int. Cl.
   *H04L 12/28* (2006.01)
(52) U.S. Cl. .................. 370/394; 370/389; 370/278; 370/336; 709/221
(58) Field of Classification Search ................ 370/278, 370/280, 336, 337, 347, 442, 389, 394; 709/220, 709/221
   See application file for complete search history.

(56) References Cited

U.S. PATENT DOCUMENTS

| 6,901,063 | B2 | 5/2005 | Vayanos et al. | |
| 2003/0147348 | A1* | 8/2003 | Jiang | .......................... 370/229 |
| 2003/0210714 | A1 | 11/2003 | Wu | |
| 2004/0004954 | A1* | 1/2004 | Terry et al. | .................. 370/349 |
| 2004/0160925 | A1 | 8/2004 | Heo et al. | |
| 2004/0203623 | A1 | 10/2004 | Wu | |
| 2005/0094586 | A1 | 5/2005 | Zhang et al. | |
| 2005/0249120 | A1 | 11/2005 | Heo et al. | |

| 2005/0287957 | A1* | 12/2005 | Lee et al. | ...................... 455/68 |

FOREIGN PATENT DOCUMENTS

JP    2004248299    9/2004

(Continued)

OTHER PUBLICATIONS

Universal Mobile Telecommunications System (UMTS); Radio Link Control (RLC) protocol specification (3GPP TS 25.322 version 6.4.0 Release 6); ETSI TS 125 322 v6.4.0 (Jun. 2005), XP002363966, pp. 1-85.

(Continued)

*Primary Examiner*—Duc M. Nguyen
*Assistant Examiner*—Anthony S. Addy
(74) *Attorney, Agent, or Firm*—Stevens, Davis, Miller & Mosher, LLP

(57) ABSTRACT

The invention relates to method and apparatus for reconfiguring a MAC entity of a MAC layer of the apparatus receiving protocol data units from a mobile terminal via on uplink upon reconfiguration of the uplink channel. Further, the invention relates to methods and mobile terminals for triggering the transmission of a status report from an RLC entity configured for an uplink channel of a network element in a radio access network, as well as a method and terminal for configuring the MAC layer of the mobile terminal. In order to enable an efficient and fast generation of RLC status reports after an uplink channel reconfiguration the invention suggests new mechanisms to trigger the transmission of status reports upon uplink reconfiguration as well a new operation and configuration of radio access network elements and UEs upon uplink channel reconfiguration, in particular a transmission time interval (TTI) reconfiguration.

46 Claims, 10 Drawing Sheets

FOREIGN PATENT DOCUMENTS

| | | |
|---|---|---|
| JP | 2005323366 | 11/2005 |
| WO | 03001681 | 1/2003 |
| WO | 2004025842 | 3/2004 |

OTHER PUBLICATIONS

Universal Mobile Telecommunications System (UMTS); Medium Access Control (MAC) protocol specification (3GPP TS 25.321 version 6.5.0 Release 6); ETSI TS 125 321 v6.5.0 (Jun. 2005), XP002363967, pp. 1-84.

3GPP TS25.401 v6.1.0, Technical Specification, 3rd Generation Partnership Project, Technical Specification Group Radio Access Network, UTRAN Overall Description (Release 6), www.3GPP.com, Jun. 2003, pp. 1-44.

3GPP TR25.896 v6.0.0, Technical Specification, 3rd Generation Partnership Project, Technical Specification Group Radio Access Network, Feasibility Study for Enhanced Uplink for UTRA FDD (Release 6), www.3GPP.com, Mar. 2004, pp. 1-179.

"Scheduled and Autonomous Mode Operation for the Enhanced Uplink," 3GPP TSG RAN WG1#31, Tdoc R1-03-0284, Tokyo, Japan, Feb. 17-20, 2003, pp. 1-7.

3GPP TS25.309v6.2.0, Technical Specification, 3rd Generation Partnership Project, Technical Specification Group Radio Access Network, FDD Enhanced Uplink, Overall Description, Stage 2 (Release 6), www.3GPP.com, Mar. 2005, pp. 1-30.

D. Chase, "Code Combining—A Maximum-Likelihood Decoding Approach for Combining an Arbitrary Number of Noisy Packets," IEEE Transactions on Communications, vol. 33, No. 5, May 1985, pp. 385-393.

3GPP TS 25.321 v6.1.0, Technical Specification, 3rd Generation Partnership Project, Technical Specification Group Radio Access Network, Medium Access Control (MAC) Protocol Specification (Release 6), www.3GPP.com, Mar. 2004, pp. 1-61.

International Search Report dated Mar. 12, 2007 and Written Opinion.

Japanese Office Action dated Dec. 12, 2006 with English translation.

3GPP TS 25.309 v6.3.0, Technical Specification Group Radio Access Network, FDD Enhanced Uplink, Overal description, Stage 2 (Release 6), www.3GPP.com, Jun. 2005, pp. 1-33.

Japanese Office Action dated May 15, 2007 with English Translation.

English translation of Japanese office Action dated Aug. 28, 2007.

* cited by examiner

MAC LAYER RECONFIGURATION IN A MOBILE COMMUNICATION SYSTEM

FIELD OF THE INVENTION

The present invention relates to method and apparatus for reconfiguring a MAC entity of a MAC layer of the apparatus receiving protocol data units from a mobile terminal via an uplink channel upon reconfiguration of the uplink channel. Further, the invention relates to methods and mobile terminals for triggering the transmission of a status report from at least one RLC entity configured for an uplink channel of a network element in a radio access network of a mobile communication system, as well as a method and terminal for configuring the MAC layer of the mobile terminal.

TECHNICAL BACKGROUND

W-CDMA (Wideband Code Division Multiple Access) is a radio interface for IMT-2000 (International Mobile Communication), which was standardized for use as the 3$^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the 3$^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments (UE) in the UMTS specifications.

UMTS Architecture

The high level Release 99/4/5 architecture of Universal Mobile Telecommunication System (UMTS) is shown in FIG. 1 (see 3GPP TR 25.401: "UTRAN Overall Description", incorporated herein by reference and available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

In the sequel two different architectures will be discussed. They are defined with respect to logical distribution of functions across network elements. In actual network deployment, each architecture may have different physical realizations meaning that two or more network elements may be combined into a single physical node.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used. Commonly, a Drift RNS 302 is used for soft handovers of UEs between different RNS.

Enhanced Uplink Dedicated Channel (E-DCH)

Uplink enhancements for Dedicated Transport Channels (DTCH) were studied by the 3GPP Technical Specification Group RAN (see 3GPP TR 25.896: "Feasibility Study for Enhanced Uplink for UTRA FDD (Release 6)", incorporated herein by reference and available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink. One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control)

retransmissions and the associated delays. This may improve the quality of service experienced by the end user.

To support enhancements described above, a new MAC sub-layer is introduced which will be called MAC-e in the following (see 3GPP TSG RAN WG1, meeting #31, Tdoc R01-030284, "Scheduled and Autonomous Mode Operation for the Enhanced Uplink" incorporated herein by reference). The entities of this new sub-layer, which will be described in more detail in the following sections, may be located in user equipment and Node B. On user equipment side, the MAC-e performs the new task of multiplexing upper layer data (e.g. MAC-d) data into the new enhanced transport channels and operating HARQ protocol transmitting entities.

Further, the MAC-e sub-layer may be terminated in the S-RNC during handover at the UTRAN side. Thus, the reordering buffer for the reordering functionality provided may also reside in the S-RNC.

E-DCH MAC Architecture—UE Side

FIG. 4 shows the exemplary overall E-DCH MAC architecture on UE side. A new MAC functional entity, the MAC-e/es, is added to the MAC architecture of Release '99. The MAC interworking on the UE side is illustrated in FIG. 5. Several MAC-d flows carry data packets from different applications to be transmitted from UE to Node B. These data flows can have different QoS requirements (e.g. delay and error requirements) and may require different configuration of HARQ instances. Each MAC-d flow represents a logical unit to which specific physical channel (e.g. gain factor) and HARQ (e.g. maximum number of retransmissions) attributes can be assigned.

Further, MAC-d multiplexing is supported for an E-DCH, i.e. several logical channels with different priorities may be multiplexed onto the same MAC-d flow. Data of multiple MAC-d flows can be multiplexed in one MAC-e PDU (protocol data unit). In the MAC-e header, the DDI (Data Description Indicator) field identifies logical channel, MAC-d flow and MAC-d PDU size. A mapping table is signaled over RRC, to allow the UE to set DDI values. The N field indicates the number of consecutive MAC-d PDUs corresponding to the same DDI value.

The MAC-e/es entity is depicted in more detail in FIG. 6. The MAC-es/e handles the E-DCH specific functions. The selection of an appropriate transport format for the transmission of data on E-DCH is done in the E-TFC Selection entity, which represents a function entity. The transport format selection is done according to the scheduling information (Relative Grants and Absolute Grants) received from UTRAN via L1, the available transmit power, priorities, e.g. logical channel priorities. The HARQ entity handles the retransmission functionality for the user. One HARQ entity supports multiple HARQ processes. The HARQ entity handles all HARQ related functionalities required. The multiplexing entity is responsible for concatenating multiple MAC-d PDUs into MAC-es PDUs, and to multiplex one or multiple MAC-es PDUs into a single MAC-e PDU, to be transmitted at the next TTI, and as instructed by the E-TFC selection function. It is also responsible for managing and setting the TSN per logical channel for each MAC-es PDU. The MAC-e/es entity receives scheduling information from Node B (network side) via Layer 1 signaling as shown in FIG. 6. Absolute grants are received on E-AGCH (Enhanced Absolute Grant Channel), relative grants are received on the E-RGCH (Enhanced Relative Grant Channel).

E-DCH MAC Architecture—UTRAN Side

An exemplary overall UTRAN MAC architecture is shown in FIG. 7. The UTRAN MAC architecture includes a MAC-e entity and a MAC-es entity. For each UE that uses an E-DCH, one MAC-e entity per Node-B and one MAC-es entity in the S-RNC are configured. The MAC-e entity is located in the Node B and controls access to the E-DCH. Further, the MAC-e entity is connected to MAC-es located in the S-RNC.

In FIG. 8 the MAC-e entity in Node B is depicted in more detail. There is one MAC-e entity in Node B for each UE and one E-DCH scheduler function in the Node-B for all UEs. The MAC-e entity and E-DCH scheduler handle HSUPA (High-Speed Uplink Packet Access) specific functions in Node B. The E-DCH scheduling entity manages E-DCH cell resources between UEs. Commonly, scheduling assignments are determined and transmitted based on scheduling requests from the UEs. The De-multiplexing entity in the MAC-e entity provides de-multiplexing of MAC-e PDUs. MAC-es PDUs are then forwarded to the MAC-es entity in the S-RNC.

One HARQ entity is capable of supporting multiple instances (HARQ processes), e.g. employing a stop and wait HARQ protocols. Each HARQ process is assigned a certain amount of the soft buffer memory for combining the bits of the packets from outstanding retransmissions. Furthermore each process is responsible for generating ACKs or NACKs indicating delivery status of E-DCH transmissions. The HARQ entity handles all tasks that are required for the HARQ protocol.

In FIG. 9 the MAC-es entity in the S-RNC is shown. It comprises the reordering buffer which provides in-sequence delivery to RLC and handles the combining of data from different Node Bs in case of soft handover. The combining is referred to as Macro diversity selection combining.

It should be noted that the required soft buffer size depends on the used HARQ scheme, e.g. an HARQ scheme using incremental redundancy (IR) requires more soft buffer than one with chase combining (CC).

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.

Serve order: The order in which users are served, e.g. random order (round robin) or according to channel quality (C/I or throughput based).

Allocation method: The criterion for allocating resources, e.g. same data amount or same power/code/time resources for all queued users per allocation interval.

In 3GPP UMTS R99/R4/R5, the packet scheduler for uplink is distributed between Radio Network Controller (RNC) and user equipment (UE). On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

E-DCH—Node B Controlled Scheduling

Node B controlled scheduling is one of the technical features for E-DCH which may enable more efficient use of the uplink resources in order to provide a higher cell throughput in the uplink and may increase the coverage. The term "Node B controlled scheduling" denotes the possibility for a Node B to control uplink resources, e.g. the E-DPDCH/DPCCH power ratio, which the UE may use for uplink transmissions on the E-DCH within limits set by the S-RNC. Node B controlled scheduling is based on uplink and downlink control signaling together with a set of rules on how the UE should behave with respect to this signaling.

In the downlink, a resource indication (scheduling grant) is required to indicate to the UE the (maximum) amount of uplink resources it may use. When issuing scheduling grants, the Node B may use QoS-related information provided by the S-RNC and from the UE in the scheduling requests to determine the appropriate allocation of resources for servicing the UE at the requested QoS parameters.

For the UMTS E-DCH, there are commonly two different UE scheduling modes defined depending on the type of scheduling grants used. In the following the characteristics of the scheduling grants are described.

Scheduling Grants

Scheduling grants are signaled in the downlink in order to indicate the (maximum) resource the UE may use for uplink transmissions. The grants affect the selection of a suitable transport format (TF) for the transmission on the E-DCH (E-TFC selection). However, they usually do not influence the TFC selection (Transport Format Combination) for legacy dedicated channels.

There are commonly two types of scheduling grants which are used for the Node B controlled scheduling:

absolute grants (AGs), and
relative grants (RGs)

The absolute grants provide an absolute limitation of the maximum amount of uplink resources the UE is allowed to use for uplink transmissions. Absolute grants are especially suitable to rapidly change the allocated UL resources.

Relative grants are transmitted every TTI (Transmission Time Interval). They may be used to adapt the allocated uplink resources indicated by absolute grants by granular adjustments: A relative grant indicates the UE to increase or decrease the previously allowed maximum uplink resources by a certain offset (step).

Absolute grants are only signaled from the E-DCH serving cell. Relative grants can be signaled from the serving cell as well as from a non-serving cell. The E-DCH serving cell denotes the entity (e.g. Node B) actively allocating uplink resources to UEs controlled by this serving cell, whereas a non-serving cell can only limit the allocated uplink resources, set by the serving cell. Each UE has only one serving cell.

Absolute grants may be valid for a single UE. An absolute grant valid for a single UE is referred to in the following as a "dedicated grant. Alternatively, an absolute grant may also be valid for a group of or all UEs within a cell. An absolute grant valid for a group of or all UEs will be referred to as a "common grant" in the following. The UE does not distinguish between common and dedicated grants.

Relative grants can be sent from serving cell as well as from a non-serving cell as already mentioned before. A relative grant signaled from the serving cell may indicate one of the three values, "UP", "HOLD" and "DOWN". "UP" respectively "DOWN" indicates the increase/decrease of the previously maximum used uplink resources (maximum power ratio) by one step. Relative grants from a non-serving cell can either signal a "HOLD" or "DOWN" command to the UE. As mentioned before relative grants from non-serving cells can only limit the uplink resources set by the serving cell (overload indicator) but can not increase the resources that can be used by a UE.

UE Scheduling Operation

This sections only outlines the principal scheduling operation, more details on the scheduling procedure is provided in 3GPP TS25.309 incorporated herein by reference. The UE maintains a Serving Grant (SG) which is common to all HARQ process, which indicates the maximum power ratio (E-DPDCH/DPCCH) the UE is allowed for the E-TFC selection. The SG is updated by the scheduling grants signaled from serving/non-serving cells. When the UE receives an absolute grant from the serving cell the SG is set to the power ratio signaled in the absolute grant. The absolute grant can activate/deactivate a single or all HARQ processes. As already mentioned before, an absolute grant can be received on primary or secondary E-RNTI. There are some precedence rules for the usage of primary/secondary absolute grants. A primary absolute grant always affects the SG immediately. Secondary absolute grants only affect the SG if the last primary absolute grant deactivated all HARQ processes, or if the last absolute grant that affected the SG was received with the secondary E-RNTI. When the transmission from primary to secondary E-RNTI is triggered, by deactivating all HARQ processes, the UE updates the Serving Grant with the latest received absolute grant on the secondary E-RNTI.

Therefore UE needs to listen to both primary and secondary E-RNTIs.

When no absolute grant is received from the serving cell the UE shall follow the relative grants from the serving cell, which are signaled every TTI. A serving relative Grant is interpreted relative to the UE power ratio in the previous TTI for the same hybrid ARQ process as the transmission, which the relative Grant will affect. FIG. 10 illustrates the timing relation for relative grants. The assumption here is that there are 4 HARQ processes. The relative grant received by the UE, which affects the SG of the first HARQ process, is relative to the first HARQ process of the previous TTI (reference process). Since a synchronous HARQ protocol is adopted for E-DCH the different HARQ processes are served successively.

The UE behavior in accordance to serving E-DCH relative grants is shown in the following:

When the UE receives an "UP" command from Serving E-DCH RLS
New SG=Last used power ratio+Delta
When the UE receives a "DOWN" command from Serving E-DCH RLS
New SG=Last used power ratio—Delta The "UP" and "DOWN" command is relative to the power ratio used for E-DCH transmission in the reference HARQ process. The new Serving Grant (SG) for all HARQ processes, affected by the relative grant, is an increase respectively decrease of the last used power ratio in the reference HARQ process. The "HOLD" command indicates that the SG remains unchanged.

As already mentioned before a Node B from a non-serving RLS is only allowed to send relative grants, which can either indicate a "HOLD" or "DOWN". The "DOWN" command enables non-serving cells to limit the intercell-interference caused by UEs which are in SHO with these non-serving cells. The UE behavior upon reception of non-serving relative grants is as follows:

When the UE receives a "DOWN" from at least one Non-serving E-DCH RLS
new SG=Last used power ratio—Delta Relative grants from a non-serving RLS affect always all HARQ processes in the UE. The amount of reduction of the used power ratio might be static or depending on the bit rate, for higher bit rates there might be a larger step size (Delta).

When the UE receives a scheduling grant from the serving RLS and a "DOWN" command from at least one non-serving RL
new SG=minimum (last used power ratio-delta, received AG/RG from serving RLS)

Rate Request signaling

In order to enable Node B to schedule efficiently while considering also the QoS requirements of a service mapped on the E-DCH, an UE provides the Node B information on its QoS requirements by means of rate request signaling.

There are two kinds of rate request signaling information on the uplink: the so called "happy bit", which is a flag related to a rate request on the E-DPCCH and the scheduling information (SI), which is commonly sent in-band on the E-DCH.

From a system point of view, the one-bit rate request may be advantageously used by the serving cell to effect small adjustments in the resource allocation for example by means of relative grants. On the contrary, scheduling information may advantageously be employed for making longer term scheduling decisions, which would be reflected in the transmission of an absolute grant. Details on the two rate request signaling methods are provided in the following.

Scheduling Information Sent on E-DCH

As mentioned before the scheduling information should provide Node B information on the UE status in order to allow for an efficient scheduling. Scheduling information may be included in the header of a MAC-e PDU. The information is commonly sent periodically to Node B in order to allow the Node B to keep track of the UE status. E.g. the scheduling information comprises following information fields:

Logical channel ID of the highest priority data in the scheduling information

UE buffer occupancy (in Bytes)
Buffer status for the highest priority logical channel with data in buffer
Total buffer status
Power status information
Estimation of the available power ratio versus DPCCH (taking into account HS-DPCCH). UE should not take power of DCHs into account when performing the estimation Identifying the logical channel by the logical channel ID from which the highest priority data originates may enable the Node B to determine the QoS requirements, e.g. the corresponding MAC-d flow power offset, logical channel priority or GBR (Guaranteed Bit Rate) attribute, of this particular logical channel. This in turn enables the Node B to determine the next scheduling grant message required to transmit the data in the UE buffer, which allows for a more precise grant allocation. In addition to the highest priority data buffer status, it may be beneficial for the Node B to have some information on the total buffer status. This information may help in making decisions on the "long-term" resource allocation.

In order for the serving Node B to be able to allocate uplink resources effectively, it needs to know up to what power each UE is able to transmit. This information could be conveyed in the form of a "power headroom" measurement, indicating how much power the UE has left over on top of that what is used for DPCCH transmissions (power status). The power status report could also be used for the triggering of a TTI reconfiguration, e.g. switching between 2 ms and 10 ms TTI and vice versa.

Happy Bit

As already explained above the happy bit denotes a one-bit rate request related flag, which is sent on the E-DPCCH. The "happy bit" indicates whether the respective UE is "happy" or "unhappy" with the current serving grant (SG).

The UE indicates that it is "unhappy", if both of the following criteria are met:
Power status criterion: UE has power available to send at higher data rates (E-TFCs) and
Buffer occupancy criterion: Total buffer status would require more than n TTIs with the current Grants (where n is configurable).

Otherwise, the UE indicates that it is "happy" with the current serving grant.

Hybrid ARQ Schemes

A common technique for error detection of non-real time services in mobile communication system is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985 incorporated herein by reference). These combined values are stored in the soft buffers of respective HARQ processes.

MAC Layer HARQ Operation at TTI Reconfiguration

As has been already indicated with respect to FIG. 10, usually more than one HARQ process is provided for the transmission of packet data units to improve system efficiency and to take into account the transmission delays. Commonly, the number of HARQ processes is preconfigured and may take into account the roundtrip time (RTT) and transmission time interval (TTI), such that for a given HARQ process feedback from the receiver is available at the beginning of the next transmission utilizing the respective HARQ process.

Considering UMTS, the E-DCH supports different TTIs, namely 2 ms and 10 ms. In a simple scenario cells would be both capable of 2 ms TTI and 10 ms TTI. UEs experiencing good channel conditions may for example be configured with a 2 ms-TTI and UEs experiencing bad channel conditions may be configured with 10 ms-TTI, since the interleaving gain is higher for longer TTIs.

One exemplary scenario may be that UEs in soft-handover (SHO) are configured with 10 ms TTI whereas UEs in not in soft-handover (non-SHO) are configured with 2 ms TTI. Every time a UE changes from non-SHO to SHO situation (or vice versa) the TTI reconfiguration is triggered.

Depending on the TTI length also the number of HARQ processes changes. For E-DCH operation in UMTS, it has been, for example, decided to utilize 4 HARQ processes for a 10 ms TTI and 8 HARQ processes in a 2 ms TTI.

The TTI reconfiguration procedure is part of the transport channel reconfiguration procedure in UMTS. A synchronized transport channel reconfiguration procedure is performed as illustrated for exemplary purposes in FIG. 11. Upon the S-RNC deciding to reconfigure the TTI for E-DCH transmissions, the S-RNC requests a Node B to prepare a radio link reconfiguration. The Node B allocates resources and notifies S-RNC that reconfiguration is ready, by using a Radio Link Reconfiguration Ready message via NBAP. In the next step a Radio Link Reconfiguration Commit message is sent from S-RNC to the Node B, which requests the Node B to switch to the new configuration at the indicated activation time. The S-RNC sends UE via RRC signaling a Transport Channel Reconfiguration message, which also includes an activation time. The UE answers with a Transport Channel Reconfiguration Complete message in response. By the definition of an activation time, it's guaranteed that UTRAN and UE switch to the new configuration at the same time instance synchronously.

When a TTI reconfiguration is triggered MAC-e PDUs transmitted utilizing the currently configured HARQ processes may be still in retransmission. Since TTI switching should be done fast when triggered, all ongoing HARQ processes that still have retransmissions outstanding at the time of TTI reconfiguration should be aborted/flushed. Aborting the pending (re)transmissions will, however, lead to an increase in the HARQ residual error ratio. Depending on whether RLC entities are operated in acknowledged mode (AM) or unacknowledged mode (UM), the abortion of retransmission will have a different impact on system level.

For RLCs in AM, there are RLC mechanisms that can be used for the recovery of the lost PDUs as will be described in the next section in further detail. Thus, there will be no impact on the SDU error rate at the expense of additional delay and also additional signaling.

For RLC in UM case the potential loss of MAC-e PDUs at TTI reconfiguration will result in a degradation of the experienced quality at service level. The extend of degradation of the end-to end quality depends mainly on how often a TTI reconfiguration is performed.

Radio Link Control Protocol

The radio link control protocol is the Layer 2 protocol used in 3G UMTS cellular systems for flow control and error recovery for both user and control data. There are three operational modes for RLC in UMTS: transparent mode (TM), unacknowledged mode (UM) and acknowledged mode (AM). Each RLC entity is configured by RRC to operate in one of these modes, as described in further detail in 3GPP TS 25.322, "Radio Link Control (RLC) protocol specification (Release 6)", (incorporated herein by reference and available at http://www.3gpp.org). The service the RLC layer provides in the control plane is called Signaling Radio Bearer (SRB). In the user plane, the service provided by RLC layer is called a Radio Bearer (RB) only if the PDCP and BMC protocols are not used by that service; otherwise the RB service is provided by the PDCP layer or BMC layer.

In transparent mode (TM) no protocol overhead is added to RLC SDUs received from higher layer. In special cases transmission with limited segmentation/reassembly capability can be accomplished. It has to be negotiated in the radio bearer setup procedure, whether segmentation/reassembly is used. The transparent mode is mainly used for very delay-sensitive services like speech.

In unacknowledged mode (UM) data delivery is not guaranteed since no retransmission protocol is used. Hence received erroneous PDUs are discarded or marked depending on the configuration. The RLC SDUs, received from higher layer, are segmented/concatenated into RLC PDUs on sender side. On receiver side reassembly is performed correspondingly. Furthermore ciphering is performed in the RLC layer. The unacknowledged mode is used, for example, for certain RRC signaling procedures. Examples of user services are the cell broadcast service (MBMS), which is currently a work item in 3GPP, and voice over IP (VoIP).

The acknowledged mode (AM) is designed for a reliable transport of packet data. Multiple-Repeat ARQ is used for retransmission of erroneous or missed PDUs. Retransmission of erroneous or lost PDUs is conducted by the sending side upon receiving a status report from the receiver. The status report can be polled by the sender or self-triggered. The receiver sends a bitmap status report to the sender when it is polled. The report indicates the reception status (either ACKs or NACKs) within the receiving window and up to the last received PDU. More details on the retransmission protocol in RLC will be provided in the next subsection. An acknowledged mode RLC can be configured to provide both in-sequence and out-of sequence delivery to higher layers. As already mentioned before, in addition to data PDU delivery, status and reset control PDUs can be signaled between the peer entities. The control PDUs can be even transmitted on a separate logical channel, thus an RLC entity in AM can be configured to utilize two logical channels. The acknowledged mode is the default mode for packet-type services, such as interactive and background services.

The functions of the RLC layer may be summarized as follows:
  Segmentation and reassembly
  Concatenation
  Padding
  Error correction
  In-sequence delivery to higher layer
  Duplicate detection
  Flow control
  Sequence number check
  Protocol error detection and recovery
  Ciphering
  Suspend/resume function for data transfer RLC ARQ Protocol With multiple-reject ARQ, the RLC protocol provides a reliable service through retransmission to packet data applications over UMTS networks in the presence of high air interface bit error rates. In case of erroneous or lost PDUs retransmission is conducted by the sender upon reception of a status report from the receiver. There are multiple mechanisms available for triggering status reports:

Periodic: a report is triggered at fixed time intervals.
  Missing PDU: a report is triggered if a break in the sequence number sequence is detected.
  Reception of a poll: a report is triggered if a poll is received from the transmitter. For the sender, a polling request is made by marking the poll bit in the header of an outgoing RLC PDU. The possible triggers and inhibitors of polling are listed as follows:
  Last PDU in Buffer: The poll bit is set when the last PDU in the transmission buffer is sent.
  Last PDU in Retransmission Buffer: The poll bit is set when the last PDU in the retransmission buffer is sent.
  Expiry of Poll Timer: A poll timer is started when a PDU with the poll bit set is sent. If a status report is received before the timer expires the timer is cancelled. If the timer expires and no status reports have been received, a PDU with the poll bit set is sent.
  Window Based Polling: A poll is triggered after the transmission window has advanced more than a certain fraction of the transmission window.
  Periodic Polling: A PDU with the poll bit set is sent periodically.
  Every Poll_PDU PDU: The sender triggers the Polling function for every Poll_PDU PDU. Both retransmitted and new AMD PDUs (PDUs in Acknowledged Mode) shall be counted.
  Every Poll_SDU SDU: The sender triggers the Polling function for every Poll_SDU SDU. The poll is triggered for the first transmission of the AMD PDU that contains the "Length Indicator" indicating the end of the SDU.
  Poll_Prohibit_Timer: The Poll Prohibit function is used by the sender to delay the initiation of the Polling function. Under the circumstances where several poll triggering options are present simultaneously in a system, a potential risk is that the network could be overwhelmed by excessive polling and status reports sent over the air interface. In WCDMA (Wideband CDMA), which is the air interface technology for UMTS, an excessive polling of status reports would result in excessive power consumption and subsequently high level of interference to other users and reduction of overall system capacity. The poll_prohibit_ timer can be implemented to deal with this problem of excessive polling and status report transmission. At the transmitter, the poll prohibit timer is started once a PDU with the poll bit set is sent. No polling is allowed until this timer expires. If multiple polls were triggered during the period when this timer was in effect, only one poll is transmitted upon expiry of the timer.

The RLC in AM at the receiver commonly maintains a number of state variables. In the following only those state variables are described, which are of particular interest for the generation of status reports:

VR(R): latest in-sequence received sequence number (marks the beginning of the receiver window)
  VR(H): highest sequence number for any PDU received
  VR(MR): highest sequence number that will be accepted as valid (marks the end of the receiver window and is set exactly to VR(R)+RxWindowSize).

Probably the most important aspect of status reports is that every single report needs to include all the sequence number gaps that exist between VR(R) and VR(H). In order to avoid excessive polling and status reports and hence the involved triggering of spurious, i.e. un-necessary, re-transmissions, the poll-prohibit function was introduced as already mentioned before.

The STATUS prohibit function is used in order to prohibit the receiver from sending a status report. The transmission of the status report is delayed, even if any of the triggering conditions above are fulfilled. An exception is made for the generation of a status report triggered by a MAC-hs reset. Similar to the Poll_Prohibit_Timer there is a STATUS_Prohibit_Timer in the receiving entity STATUS_Prohibit_Timer: The timer Timer_Status_Prohibit is started when a status is sent out. If a status report is triggered while the corresponding timer is running, its transmission will be delayed until the said timer expires. To ensure that spurious re-transmissions are not triggered, the STATUS_Prohibit_Timer should be set to a value slightly longer than the expected round-trip-time. This will give enough time for the NACKs to be received on the other side and the re-transmissions to make their way to the receiver before the next status report is sent out.

As already explained above, there is a potential risk for a loss of PDUs due aborting/flushing pending HARQ (re) transmission upon TTI reconfiguration. There are several RLC mechanisms to recover lost PDUs for RLC in AM mode:

The receiving entity in the S-RNC detects missing PDUs
  The transmitting entity in UE polls the receiving entity for sending a status report In the first case, the receiving entity in SRNC detects missing PDUs. Upon detection of missing PDUs RLC generates a status report, which is sent to the transmitting entity. The UE just starts after TTI reconfiguration with the transmission of RLC PDUs from where it stopped before TTI switching. The RLC receiving entity recognizes the out-of sequence delivery of data and then generates an RLC status report indicating the missing PDUs. The UE will upon reception of the RLC status report initiate the retransmission of the indicated PDUs. There is some latency inherited in this scheme since RLC receiving entity in SRNC needs to rely on receiving RLC PDUs after the TTI reconfiguration. The RLC PDU reception required for determining missing PDUs suffers from queuing delay in the UE, successful reception at Node B after HARQ processing and the Iub delay. Therefore it's not possible to recover lost PDUs with minimal delay after TTI switching when relying on this mechanism.

In the second case, the transmitting entity in UE polls the receiving entity for a status report. The polling is done after the TTI reconfiguration procedure is completed. The UE first polls each RLC AM entity mapped to E-DCH for the generation of a status report. After receiving the status report at the UE, the retransmission of the lost PDUs can be initiated. Ideally the time instant for UE polling should be done as soon as the TTI reconfiguration is completed in order to allow for fast recovery. However as outlined in a previous section the triggers for polling a status report are not aligned with the TTI reconfiguration but are tied to predefined events like for example timers.

In conclusion both schemes described above suffer from a delayed generation of status reports after the TTI reconfiguration.

This operation, however, does also not allow for a fast and efficient recovery of lost PDUs. In case transmission is performed in the AM mode, data PDUs are only delivered from RLC to higher layers if in-sequence delivery can be provided. Therefore a fast processing of lost PDUs is required in order not to stall the RLC protocol and hence to degrade the quality of service.

SUMMARY OF THE INVENTION

According to a first embodiment of the invention, a method for reconfiguring a MAC entity of a MAC layer upon reconfiguration of the uplink channel is provided. The MAC entity receives protocol data units from a mobile terminal via an uplink channel. The MAC entity may be comprised in a network element in a radio access network of a mobile communication system.

In response to a reconfiguration of the uplink channel, the network element may provide protocol data units being stored in at least one reordering buffer of the MAC entity to an RLC layer comprising at least one RLC entity mapped to the uplink channel and may further flush the protocol data units in the at least one reordering buffer of the MAC entity.

Next, each of the at least one RLC entity may determine the status of the protocol data units received from the mobile terminal, may generate a status report based on the processing result, and may transmit the status report to the mobile terminal. This method of reconfiguring the MAC entity has the advantage that status reports are triggered at minimum delay in response to a reconfiguration of the uplink channel. In another advantageous embodiment of the invention, the status of the protocol data units may be determined inter alia by reordering at each of the at least one RLC entity the protocol data units based on a sequence number comprised in the protocol data units and by determining whether protocol data units having a sequence number in a given sequence number range are missing. In this exemplary embodiment, the status report indicates at least the successfully received or missing protocol data units to the mobile terminal.

Further, in a variation of the embodiment, the MAC entity of the network element may receive the missing protocol data units in response to the at least one status report via the reconfigured uplink channel.

According to a further embodiment of the invention, the network element may receive a primitive at the MAC layer indicating to the MAC entity of the MAC layer to provide the protocol data units stored in the at least one reordering buffer to the at least one RLC entity and to flush the protocol data units stored in the at least one reordering buffer of the MAC entity. For example, the primitive received at the MAC layer is provided by a RRC layer.

In a further exemplary variation of the embodiment, the primitive provided to the MAC layer is provided by the RRC layer in response to receiving a message from the mobile terminal at the RRC layer indicating the completion of the reconfiguration of the uplink channel.

By means of the communication of primitives between the protocol layers the operations performed by the respective layer receiving the primitive may be efficiently controlled and/or triggered in response to events at other protocol layers or in response to control messages.

In another exemplary embodiment of the invention, the entities of the network element may further perform the following step upon having provided the protocol data units stored in the at least one reordering buffer of the MAC entity to the at least one RLC entity: the MAC entity of the network entity may providing a primitive to the RLC layer indicating to all RLC entities mapped to the uplink channel to determine the status of the protocol data units having been received from the mobile terminal by the RLC entities and to generate a status report for transmission to the mobile terminal. Thereby, the status of the protocol data units is determined upon having provided same to the at least one RLC entity, in order to ensure a correct result of the determined status.

According to a further exemplary embodiment, the transmission of the status report transmitted in response to the reset of the MAC entity following the reconfiguration of the uplink channel is not prohibited from transmission by a timer defining a time period in which the at least one RLC entity is prohibited from sending a status report. Thus, it is possible to trigger the generation and transmission of a status report every time a reconfiguration of the uplink channel, even if state parameters of the RLC would actually prohibit the generation and transmission of the status report.

Further, it is also possible to generate a status report by the at least one RLC entity in response to a periodic trigger or in response to an event trigger and to transmit the status report to the mobile terminal. Further, upon transmission the timer at the at least one RLC entity may be started upon transmission of the status report, wherein the at least one RLC entity is prohibited from transmitting a further status report in response to a periodic trigger or in response to an event trigger, if the timer has not expired, while the transmission of the status report transmitted in response to the reset of the MAC entity following a reconfiguration of the uplink channel is not prohibited by the timer. Thus in this variation, periodically triggered or event triggered status reports ma still be prohibited by the timer, while status reports in response following a reconfiguration of the uplink channel is not prohibited by the timer.

In a further embodiment of the invention, the network element may receive a control protocol data unit upon having reconfigured the uplink channel from the mobile terminal at each of the at least one RLC entity configured for the uplink channel indicating a respective one of the at least one RLC entity to provide a status report to the mobile terminal. Hence, alternatively to triggering the generation and transmission of a status report in response to an uplink channel reconfiguration by the network element, also a mobile terminal may trigger the generation and transmission of a status report.

In a more specific embodiment of the invention, the network element may receive a reconfiguration message from the mobile terminal at the RRC layer comprising a flag indicating to all RLC entities configured for the uplink channel to generate and to transmit a status report to the mobile terminal. For example, the reconfiguration message may be a transport channel reconfiguration complete message.

According to another embodiment of the invention the reconfiguration of the uplink channel is an uplink transport channel reconfiguration. For example, the transport channel reconfiguration may be a reconfiguration of the TTI used for transmission or any other transport channel parameter requiring or resulting in a change of the number of HARQ processes utilized for uplink transmissions.

More specifically, the uplink channel may be divided in transmission time intervals (TTIs), wherein in each transmission time interval data is transmitted to the network entity via the uplink channel. Further, the reconfiguration may include changing the transmission time interval of the uplink transport channel.

Alternatively, according to another embodiment of the invention, the reconfiguration of the uplink channel is a physical channel (re)configuration. For example, the (re)configuration of the physical channel may include a process activation/deactivation procedure in which individual or a plurality of HARQ processes are activated or deactivated for uplink transmission. Since the number of HARQ processes the UE is allowed to use for uplink data transmission may change due to this (re)configuration, it may be beneficial to generate RLC status reports upon reconfiguration of the physical channel.

In a further embodiment of the invention, the reconfiguration of the uplink channel is triggered in response to the mobile terminal entering into soft handover or in response to the mobile terminal moving out of a soft handover region.

Further, the at least one RLC entity mapped to the uplink channel may be operated in acknowledged mode.

Another embodiment of the invention provides an apparatus in a radio access network of a mobile communication system for reconfiguring a MAC entity of a MAC layer receiving protocol data units from a mobile terminal via an uplink channel upon reconfiguration of the uplink channel. The apparatus may comprise a MAC entity configured to perform functions of the MAC layer, wherein the at least one MAC entity comprises at least one reordering buffer of the network element, and at least one RLC entity mapped to the uplink channel and configured to perform functions of the RLC layer. Further, the apparatus may include a data transfer unit configured to provide protocol data units being stored in the at least one reordering buffer of the MAC entity to the RLC layer in response to a reconfiguration of the uplink channel. The apparatus may also comprise a processing unit configured to flush the protocol data units in the at least one reordering buffer of the MAC entity in response to the reconfiguration of the uplink channel, and configured to determine the status of the protocol data units received from the mobile terminal at each of the at least one RLC entity. Moreover, a report generation unit of the apparatus may be configured to generate a status report based on the processing result, and a transmitter may be included for transmitting the status report to the mobile terminal.

In a further embodiment, the apparatus may also comprise communication unit for receiving a primitive at the MAC layer indicating to the MAC entity of the MAC layer to provide the protocol data units stored in the at least one reordering buffer to the at least one RLC entity and to flush the protocol data units stored in the at least one reordering buffer of the MAC entity.

For example, the primitive received at the MAC layer is provided by RRC layer.

Moreover, the primitive provided to the MAC layer may be provided by the RRC unit in response to receiving a message from the mobile terminal at the RRC layer indicating the completion of the reconfiguration of the uplink channel.

In another embodiment of the invention, the communication unit is further configured to provide a primitive from the MAC entity to the RLC layer indicating to all RLC entities mapped to the uplink channel to determine the status of the protocol data units having been received from the mobile terminal by the RLC entities and to generate a status report for transmission to the mobile terminal upon having provided the protocol data units stored in the at least one reordering buffer of the MAC entity to the at least one RLC entity.

Further, according to another embodiment, the communication unit is further configured to receive a control protocol data unit upon having reconfigured the uplink channel from the mobile terminal at each of the at least one RLC entity configured for the uplink channel indicating a respective one of the at least one RLC unit to provide a status report to the mobile terminal.

In a further embodiment of the invention the communication unit is further configured to receive a reconfiguration message from the mobile terminal at the RRC layer comprising a flag indicating to all RLC entities configured for the uplink channel to generate and to transmit a status report to the mobile terminal.

Moreover, it may also be foreseen to comprise further units in the apparatus being configured to perform the steps of the method for reconfiguring a MAC entity of a MAC layer according to the different embodiments and variations thereof described above. The invention according to a further embodiment relates to a computer readable medium storing instructions that, when executed by a processor of an apparatus in an access network of a mobile communication system, causes the apparatus to reconfigure a MAC entity of a MAC layer receiving protocol data units from a mobile terminal via an uplink channel upon reconfiguration of the uplink channel. The instructions may cause the apparatus to reset a MAC entity by providing in response to a reconfiguration of the uplink channel protocol data units being stored in the at least one reordering buffer of the MAC entity to an RLC layer comprising at least one RLC entity mapped to the uplink channel and flushing the protocol data units in the at least one reordering buffer of the MAC entity, determining the status of the protocol data units received from the mobile terminal at each of the at least one RLC entity, generating a status report based on the processing result, and transmitting the status report to the mobile terminal.

In another embodiment of the invention the computer readable medium further stores instructions that, when executed by the processor of the apparatus, cause the apparatus to perform the steps of the method for reconfiguring a MAC entity of a MAC layer according to the different embodiments and variations thereof described above.

Another embodiment of the invention relates to the operation of a mobile terminal and provides a method for triggering the transmission of a status report from at least one RLC entity configured for an uplink channel of a network element in a radio access network of a mobile communication system. The mobile terminal may reconfigure the uplink channel, transmit in response to the reconfiguration of the uplink channel a message from the mobile terminal to the network element, wherein the message indicates to the at least one RLC entity configured for an uplink channel to generate and transmit a status report, and receive a status report from the at least one RLC entity in response to the message.

The reconfiguration of the uplink channel may be for example an uplink transport channel reconfiguration. In the latter case the uplink channel may be divided in transmission time intervals, wherein in each transmission time interval data is transmitted from the mobile terminal via the uplink channel, and the reconfiguration may include changing the transmission time interval of the uplink transport channel.

In a further embodiment of the invention, the mobile terminal may transmit protocol data units via the uplink channel utilizing at least one HARQ process, wherein the protocol data units transmitted with a respective one of the at least one HARQ process are assigned a transmission sequence number indicating the sequence of protocol data units from one logical channel, and may reset the transmission sequence number in response to the reconfiguration of the uplink channel.

According to another embodiment of the invention, the mobile terminal may receive at least one absolute grant, wherein the at least one absolute grant indicates to the mobile terminal whether to activate or deactivate a respective one of a plurality of HARQ processes for the transmission of uplink scheduled data via the uplink channel. Upon reconfiguring the uplink channel, the mobile terminal may activate the HARQ processes that have been previously deactivated by the at least one absolute grant.

In a variation, the mobile terminal may receive at least one signaling message of the RRC layer indicating to deactivate at least one of the plurality of HARQ processes and the HARQ processes that have been previously deactivated by the at least one signaling message are activated upon reconfiguring the uplink channel.

Another embodiment of the invention relates to a method for configuring a MAC layer of a mobile terminal. The mobile terminal may thereby transmit protocol data units via the uplink channel utilizing at least one HARQ process of the MAC layer, wherein the protocol data units transmitted with a respective one of the at least one HARQ process are assigned a transmission sequence number indicating the sequence of the protocol data units from one logical channel in which the protocol data units are placed in the at least one reordering buffer. Further the mobile terminal reconfigure the uplink channel, and resets the transmission sequence number in response to the reconfiguration the uplink channel.

The transmission sequence number may be for example used by a MAC entity at the MAC layer of a receiving apparatus to provide in-sequence delivery of received packet data units to an upper layer.

Further, the mobile terminal may also reset the transmission sequence number to an initial value, e.g. 0, for the transmission of the first protocol data unit of a logical channel transmitted via the uplink channel after reconfiguration.

Another embodiment of the invention relates to a mobile terminal for triggering the transmission of a status report from at least one RLC entity configured for an uplink channel of a network element in a radio access network of a mobile communication system. The mobile terminal may comprise a reconfiguration unit configured to reconfigure the uplink channel, and a transmitter for transmitting a message from the mobile terminal to the network element in response to the reconfiguration of the uplink channel, wherein the message indicates to the at least one RLC entity configured for an uplink channel to generate and transmit a status report. Further, the mobile terminal may be provided with a receiver for receiving a status report from the at least one RLC entity in response to the message.

In another embodiment of the invention, the mobile terminal further comprises means configured to perform the steps of the method for configuring a MAC layer of the mobile terminal or the method for triggering the transmission of a status report from at least one RLC entity according to the different embodiments of the invention described herein. Another embodiment relates to a further mobile terminal for configuring a MAC layer of the mobile terminal. In this embodiment of the invention the mobile terminal comprises a transmitter for transmitting protocol data units via the uplink channel utilizing at least one HARQ process of the MAC layer, wherein the mobile terminal is configured to assign the protocol data units transmitted with a respective one of the at least one HARQ process a transmission sequence number indicating the sequence of the protocol data units of a logical channel in which the protocol data units are placed in the at least one reordering buffer. Further, the mobile terminal is provided with a reconfiguration unit configured to reconfigure the uplink channel, and a configuration unit for resetting the transmission sequence number in response to the reconfiguration the uplink channel.

In a variation, the mobile terminal may further comprises means configured to use the transmission sequence number is used within a MAC entity at the MAC layer of a mobile terminal to provide in-sequence delivery of received packet data units to an upper layer. The mobile terminal may also be configured to reset the transmission sequence number is reset for the transmission of the first protocol data unit of a logical channel transmitted via the uplink channel after reconfiguration. The transmission sequence number is reset an initial value, e.g 0.

Another embodiment of the invention relates to a computer readable medium that stores instruction that, when executed by a processor of a mobile terminal, cause the mobile terminal to trigger the transmission of a status report from at least one RLC entity configured for an uplink channel of a network element in a radio access network of a mobile communication system. The instructions may cause the mobile terminal to trigger the transmission of a status report by reconfiguring the uplink channel, transmitting in response to the reconfiguration of the uplink channel a message from the mobile terminal to the network element, wherein the message indicates to the at least one RLC entity configured for an uplink channel to generate and transmit a status report, and receiving a status report from the at least one RLC entity in response to the message.

In a variation the computer readable medium may also store instructions that, when executed by the processor of the mobile terminal, cause the mobile terminal to perform the steps of the method for configuring a MAC layer of the mobile terminal or the method for triggering the transmission of a status report from at least one RLC entity according to the different embodiments of the invention described herein.

A further embodiment of the invention provides a computer readable medium storing instruction that, when executed by a processor of a mobile terminal, cause the mobile terminal to configure a MAC layer of a mobile terminal by transmitting protocol data units via the uplink channel utilizing at least one HARQ process of the MAC layer, wherein the protocol data units transmitted with a respective one of the at least one HARQ process are assigned a transmission sequence number indicating the sequence of the protocol data units of a logical channel in which the protocol data units are placed in the at least one reordering buffer, reconfiguring the uplink channel, and resetting the transmission sequence number in response to the reconfiguration the uplink channel.

In a variation this computer readable medium may further store instructions that, when executed by the processor of the mobile terminal, cause the mobile terminal to perform the steps of the method according to the different embodiments of the inventions described herein.

Another embodiment of the invention relates to the handling of HARQ process restrictions upon reconfiguration of an uplink channel. Accordingly, a method for configuring a MAC layer of a mobile terminal is provided. The mobile terminal may receive at least one absolute grant, wherein the at least one absolute grant indicates to the mobile terminal whether to activate or deactivate a respective one of a plurality of HARQ processes for the transmission of uplink scheduled data via an uplink channel. The mobile terminal may reconfigure the uplink channel, and upon reconfiguring the uplink channel, activate the HARQ processes that have been previously deactivated by the at least one absolute grant.

In a variation of the embodiment, the mobile terminal may receive at least one signaling message of the RRC layer indicating to deactivate at least one of the plurality of HARQ processes. The HARQ processes that have been previously deactivated by the at least one signaling message are activated upon reconfiguring the uplink channel according to this variation of the embodiment.

Also a mobile terminal specially configured to handle of HARQ process restrictions upon reconfiguration of an uplink channel is provided in a further embodiment of the invention. The mobile terminal for configuring a MAC layer may thereby comprise a receiver for receiving at least one absolute grant, wherein the at least one absolute grant indicates to the mobile terminal whether to activate or deactivate a respective one of a plurality of HARQ processes for the transmission of uplink data via an uplink channel, and a reconfiguration unit configured to reconfigure the uplink channel, and to activate the HARQ processes that have been previously deactivated by the at least one absolute grant upon reconfiguration of the uplink channel.

The mobile terminal according a further embodiment may comprise the receiver further configured to receive at least one signaling message of the RRC layer indicating to deactivate at least one of the plurality of HARQ processes and the reconfiguration unit being further configured to activate the HARQ processes that have been previously deactivated by the at least one signaling message upon reconfiguring the uplink channel. Another embodiment of the invention relates to a computer readable medium storing instructions that, when executed by a processor of a mobile terminal, causes the mobile terminal to configure a MAC layer of a mobile terminal by receiving at least one absolute grant, wherein the at least one absolute grant indicates to the mobile terminal whether to activate or deactivate a respective one of a plurality of HARQ processes for the transmission of uplink scheduled data via an uplink channel, reconfiguring the uplink channel, and upon reconfiguring the uplink channel, activating the HARQ processes that have been previously deactivated by the at least one absolute grant.

The computer readable medium according to a variation of the embodiment, further stores instructions that, when executed by the processor of the mobile terminal, cause the mobile terminal to receive at least one signaling message of the RRC layer indicating to deactivate at least one of the plurality of HARQ processes, wherein the HARQ processes that have been previously deactivated by the at least one signaling message are activated upon reconfiguring the uplink channel.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
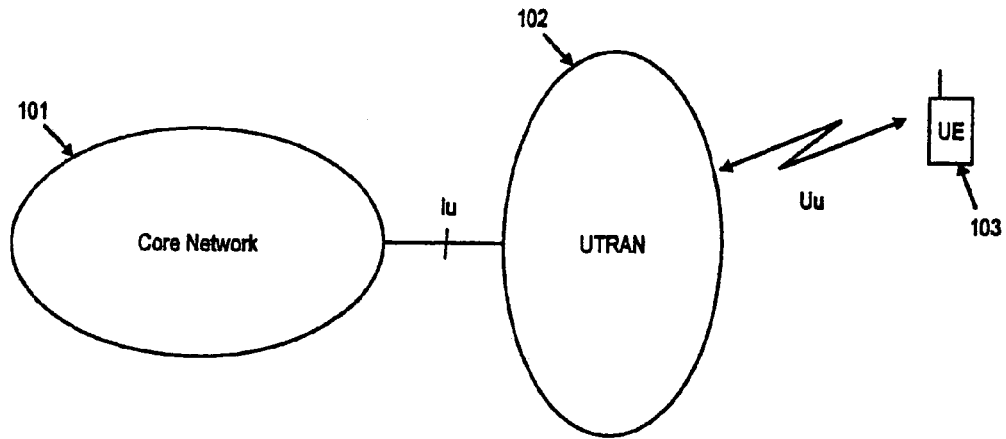
FIG. 1 shows the high-level architecture of UMTS.
Figure 2:
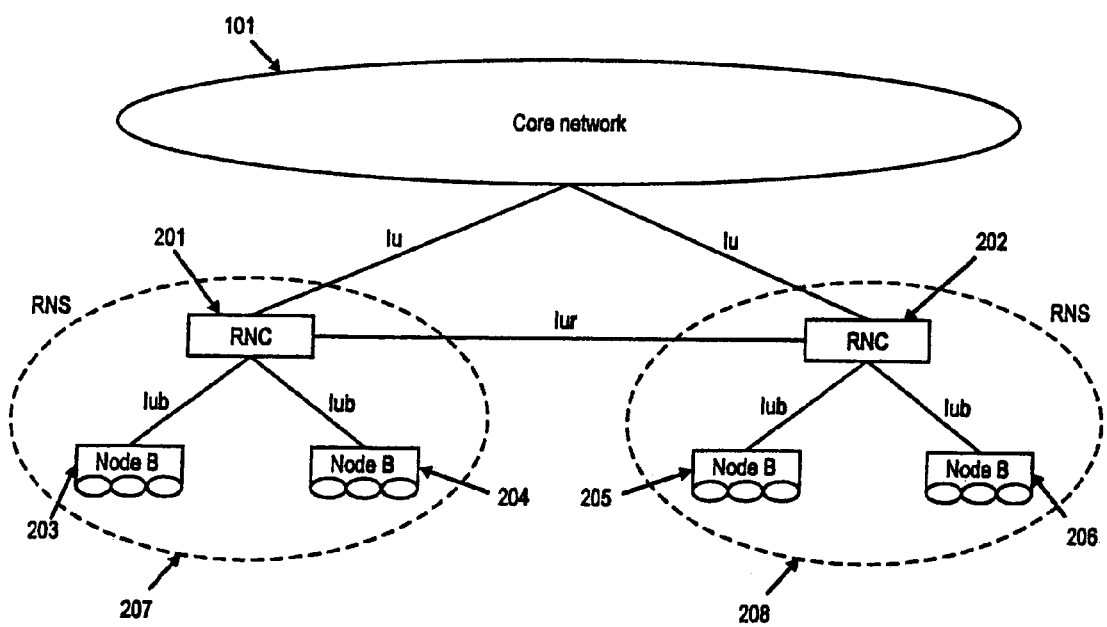
FIG. 2 shows the architecture of the UTRAN according to UMTS R99/4/5.
Figure 3:
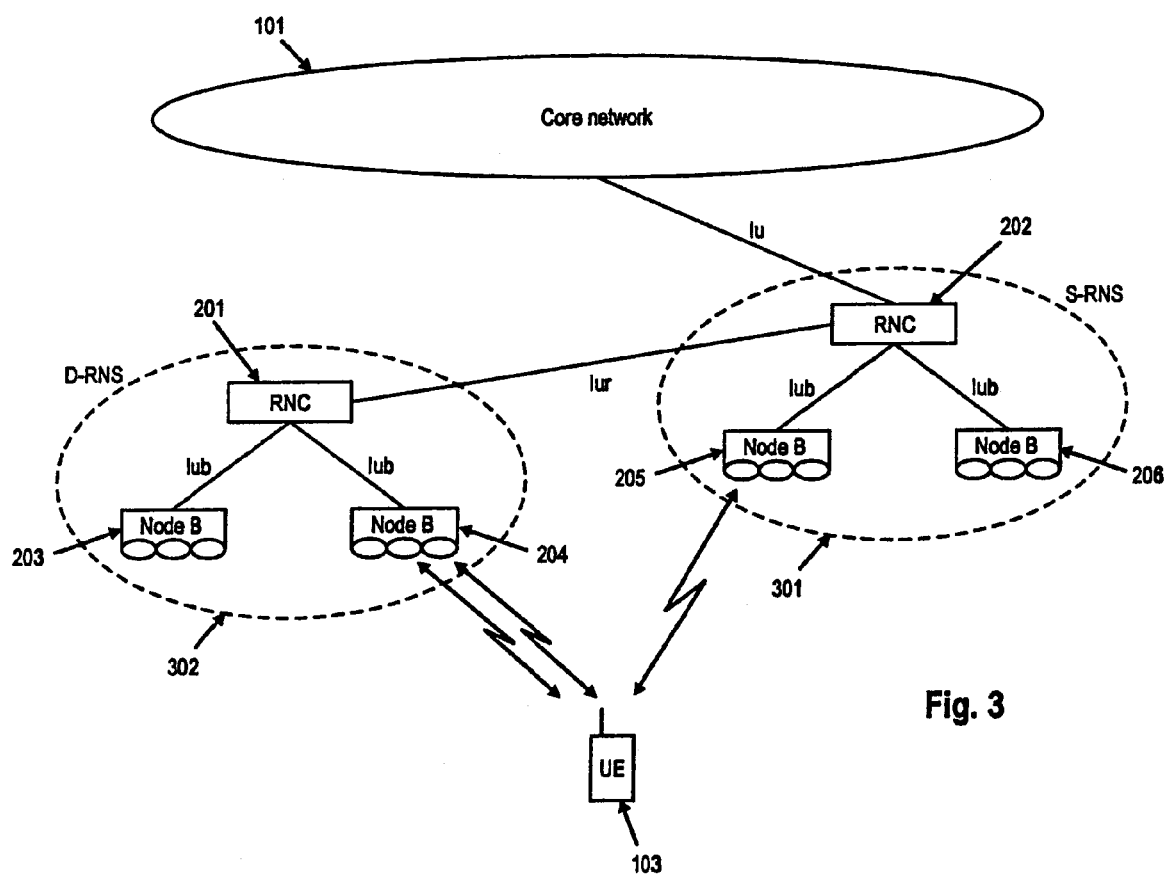
FIG. 3 shows a Drift and a Serving Radio Subsystem.
Figure 4:
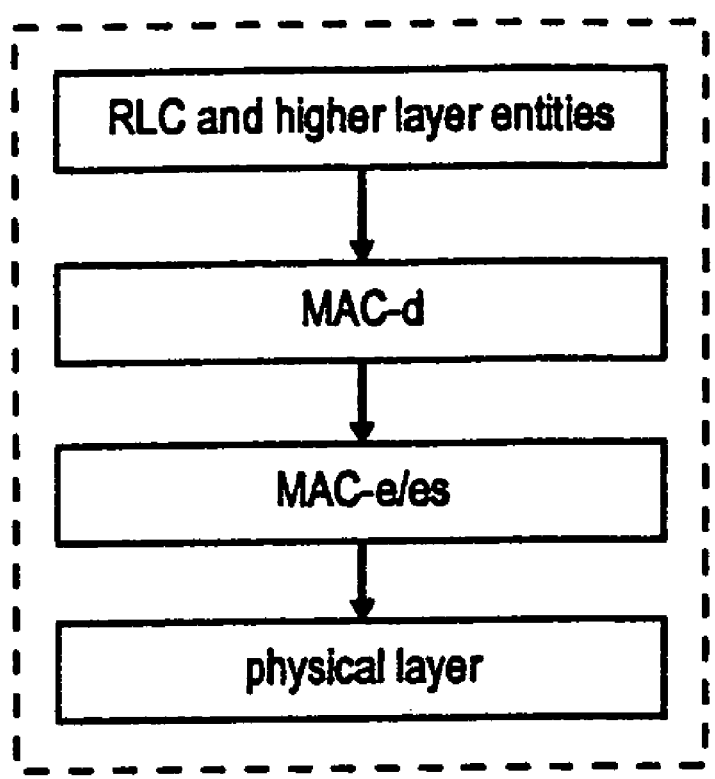
FIG. 4 shows the overall E-DCH MAC architecture at a user equipment.

The following paragraphs will describe various embodiments of the invention. For exemplary purposes only, most of the embodiments are outlined in relation to a UMTS communication system and the terminology used in the subsequent sections mainly relates to the UMTS terminology, as the invention may be advantageously used in this type of communication network. However, the terminology used and the description of the embodiments with respect to a UMTS architecture is not intended to limit the principles and ideas of the inventions to such systems.

Also the detailed explanations given in the Technical Background section above are intended to better understand the mostly UMTS specific exemplary embodiments described in the following and should not be understood as limiting general ideas underlying the invention to the described specific implementations of processes and functions in the mobile communication network.

Nevertheless, the following sections also describe some embodiments of the invention that are implemented in a system using the UMTS architecture and providing the features described in the Technical Background section. In these embodiments, some of the features described in the Technical Background section may be modified or additional features may be added to the system, as will be outlined in more detail below. In general, one of the aspects of the invention is to generate and transmit a status report from those RLC entities of the RLC layer in a network element being mapped to an uplink channel upon reconfiguration of the uplink channel. According to different embodiments of the invention, new triggers for the generation and transmission of status reports are introduced that allow for a reset of the MAC entity in the MAC layer of the network element with minimal degradation of the Quality of Service (QoS) due to the uplink channel reconfiguration. As will be explained in more detail in the following, a mobile terminal may trigger the generation and transmission of status report by signaling or, alternatively, a protocol layer in the network element responsible for triggering the uplink channel reconfiguration may indicate to the RLC and/or MAC layer entities in the network that a reconfiguration has been or is performed in order to trigger generation and transmission of status report from the network element to the mobile terminal.

The network element may be a network element of the radio access network of a mobile communication system in which the invention is implemented. Advantageously, according to one embodiment of the invention, the network element is an apparatus in the access network terminating the protocol layer responsible for the reconfiguration of the uplink channel. For example, in the UMTS architecture, the network element may be the network element terminating the RLC layer protocol for the UEs, which is at present the serving radio network controller (S-RNC).

In a further embodiment of the invention, the reconfiguration of the uplink channel may be a reconfiguration of the transport channel in the MAC layer, such as a TTI reconfiguration described previously in the document. Alternatively or in addition thereto, the reconfiguration of the uplink channel may reconfigure the physical channel. According to another embodiment of the invention, the reconfiguration of the uplink channel results in a reconfiguration of the number of HARQ processes used for uplink data transmission by a UE for which the uplink channel is reconfigured.

The new mechanisms described above are also illustrated in FIG. 13, illustrating an exemplary embodiment of the invention. For the individual steps illustrated in the flow chart an exemplary implementation in a UMTS environment as described in the Technological Background section will be provided with reference to FIG. 12, illustrating an exemplary uplink channel reconfiguration according to a more specific embodiment of the invention.

At first a network entity in the radio access network that is responsible of resource control and/or soft handovers of mobile terminals (UEs in UMTS) in the communication network decides to reconfigure the uplink channel of a mobile terminal, for which it manages resources. For example, this network element may be an S-RNC as indicated above and as denoted in FIG. 13. Typically, the reconfiguration of the uplink channel starts with a radio link reconfiguration 1301 in the access network in order to (re)configure the transport bearer in the radio access network between the base station (Node B) and the network element providing resource control functionality (e.g. S-RNC).

Figure 12:
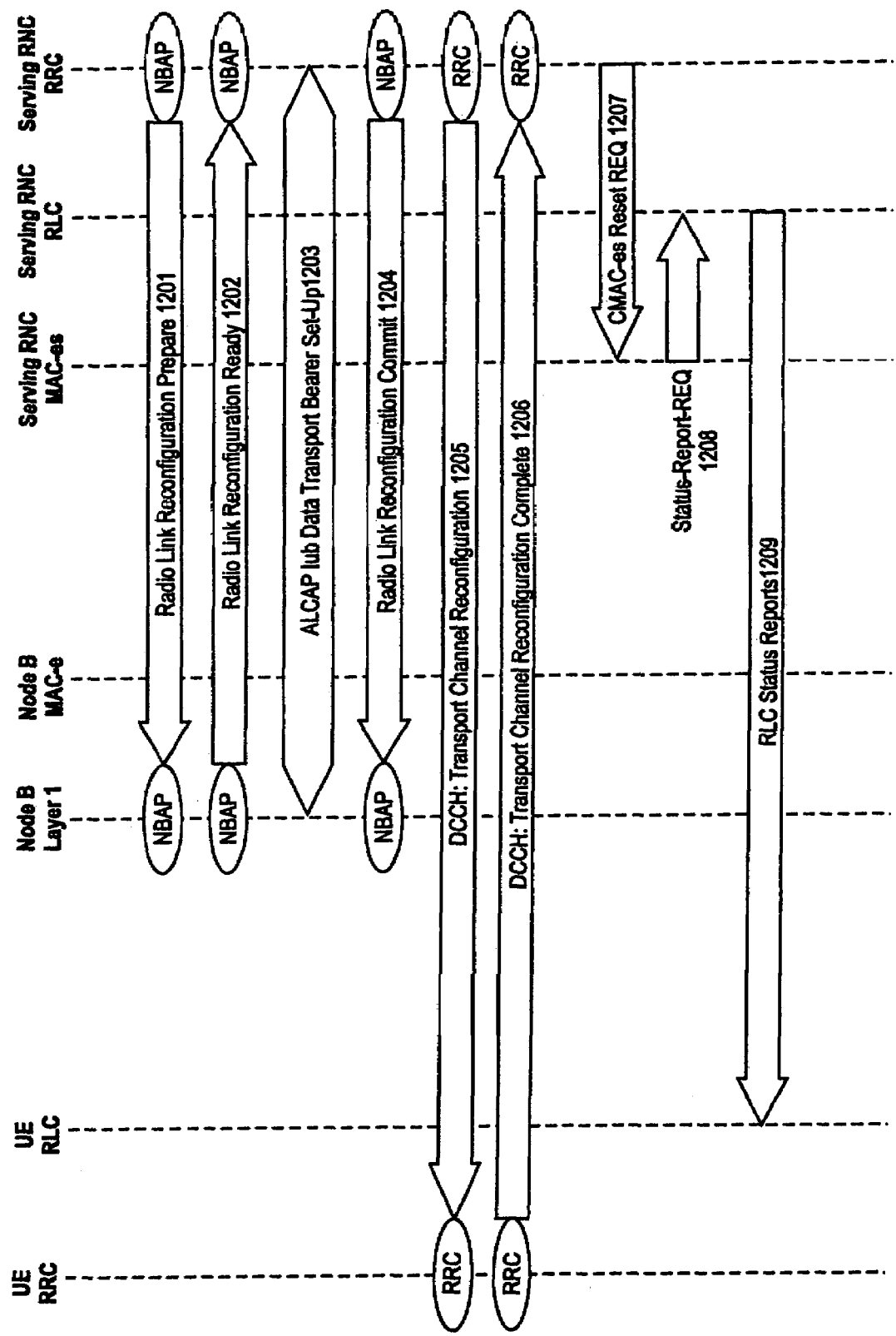
FIG. 12 shows an exemplary signaling diagram of a uplink channel reconfiguration according to one embodiment of the invention.

Turning now to FIG. 12, the radio link reconfiguration 1301 in the access network may be initiated by the radio resource control RRC layer at the S-RNC. The RRC layer transmits 1201 a radio link reconfiguration prepare message to the Node B utilizing the Node B Application Part (NBAP) protocol, requesting Node B to prepare reconfiguration of the transport channel (E-DCH). Having received the message and having allocated resources, the Node B responds 1202 by a radio link reconfiguration ready message notifying that the reconfiguration is ready. The S-RNC may further initiate (if needed) the establishment of a new Iub Data Transport Bearers using the ALCAP protocol. Afterwards, the NBAP message Radio Link Reconfiguration Commit is sent 1204 from SRNC to Node B to inform Node B about the activation time at which the (re)configured radio link should be used.

The RRC layer of the S-RNC provides 1205 a reconfiguration message to the UE in order to indicate to reconfigure the uplink channel and to provide the necessary parameters for reconfiguration (e.g. in Information Elements IE) to the UE. In the exemplary embodiment shown in FIG. 12, this message is a transport channel reconfiguration message provided to the UE via a dedicated control channel DCCH. In another communication system than the UMTS system referred to in this exemplary embodiment, it may also be possible to use a common control channel instead. Upon reception of the message and parameters, the UE proceeds and reconfigures the uplink channels based on the parameters indicated by the IEs and returns 1206 an indication to the S-RNC that the reconfiguration has been performed (e.g. transport channel reconfiguration complete message). For example, the reconfiguration may be a reconfiguration of the transport channel where the TTI is changed which includes the reconfiguration of HARQ processes that can be employed for uplink channel data transmissions by the UE.

Figure 5:
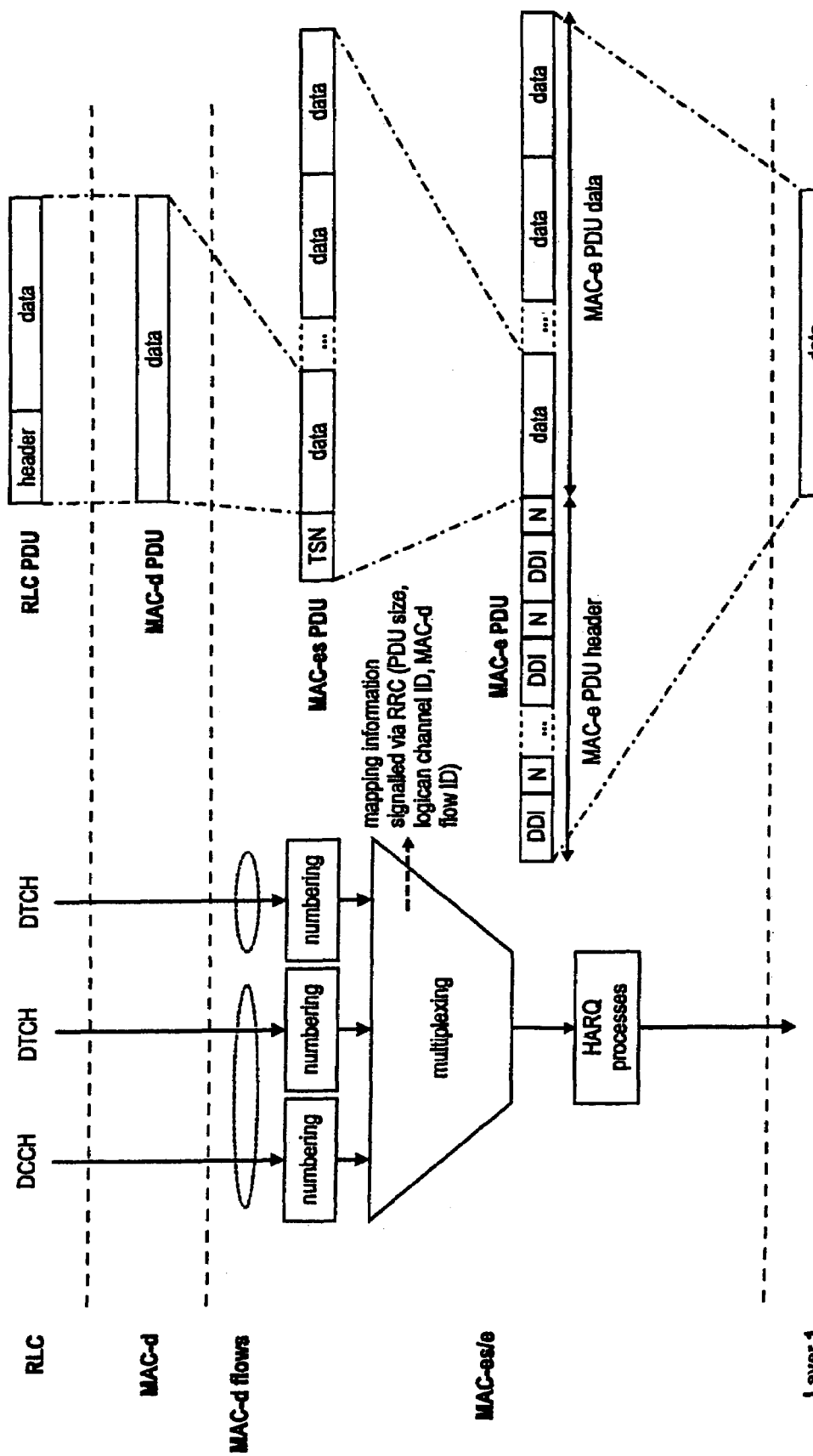
FIG. 5 shows the MAC interworking in a simplified architecture at a user equipment.
Figure 6:
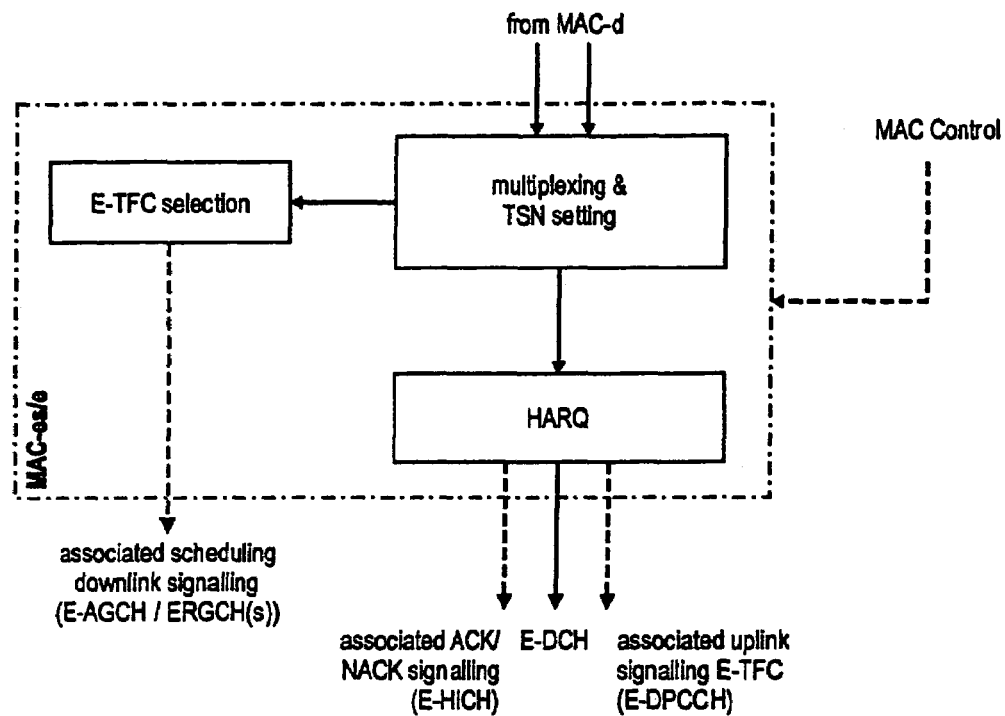
FIG. 6 shows the MAC-e/es architecture at a user equipment.
Figure 8:
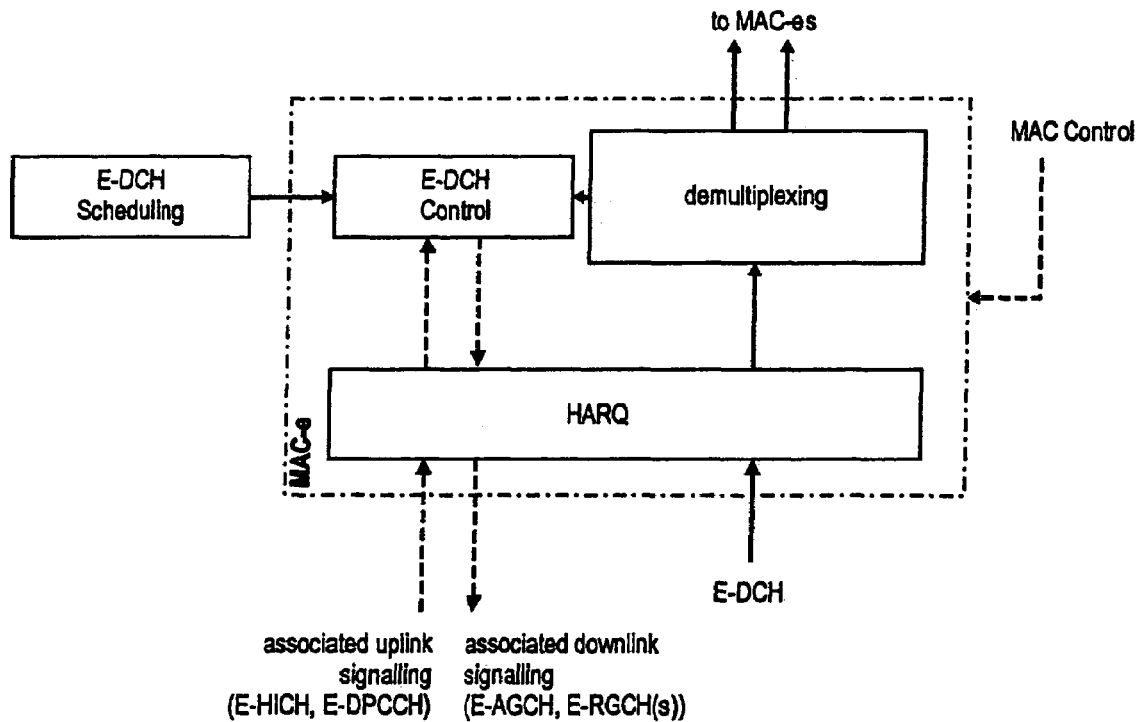
FIG. 8 shows the MAC-e architecture at a Node B.
Figure 7:
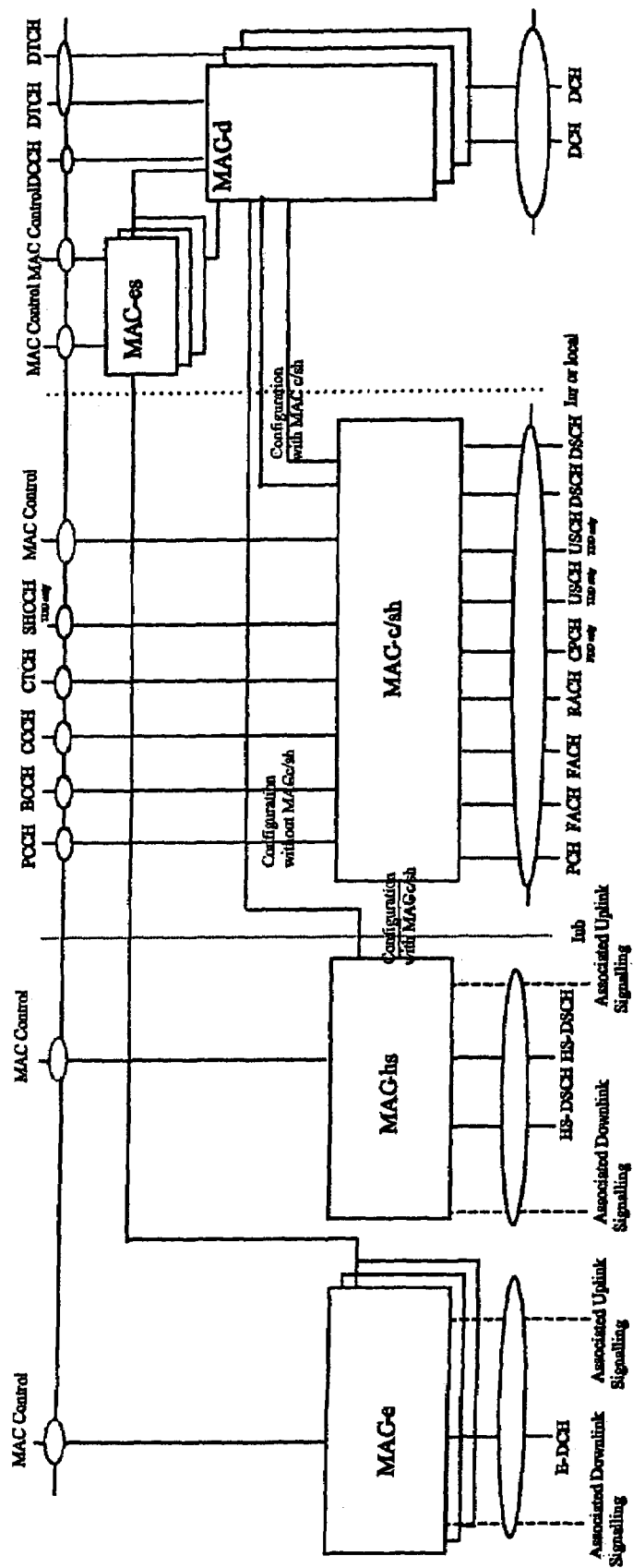
FIG. 7 shows an overall MAC architecture in the UTRAN.
Figure 9:
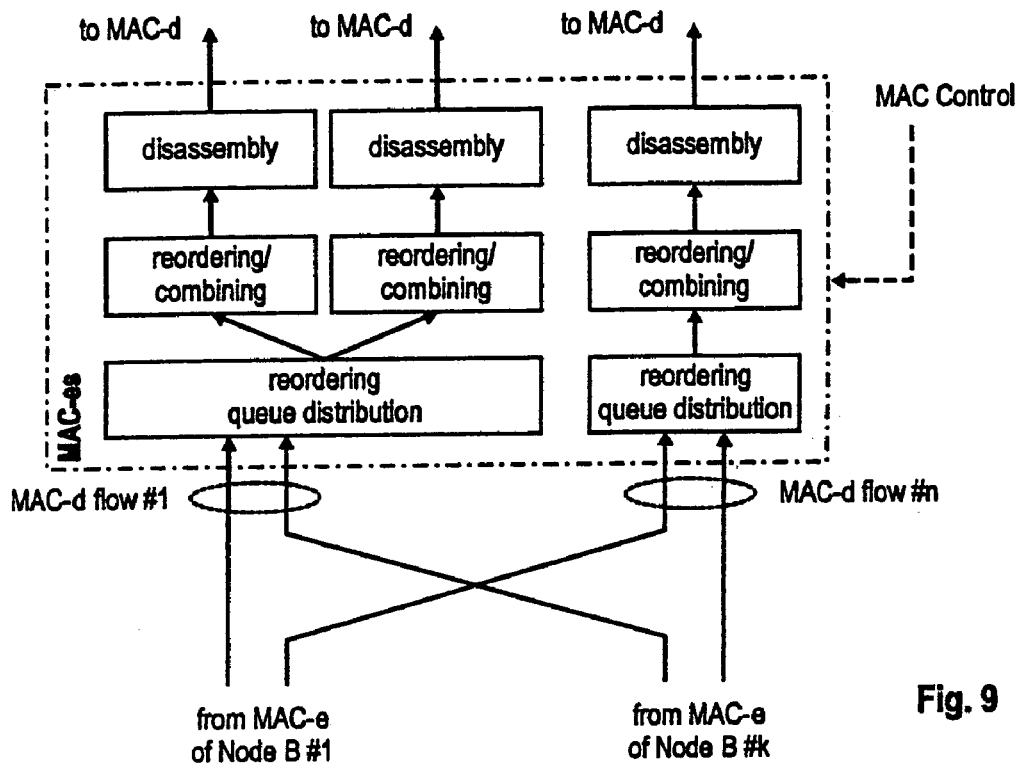
FIG. 9 shows the MAC-es architecture at a S-RNC.
Figure 10:
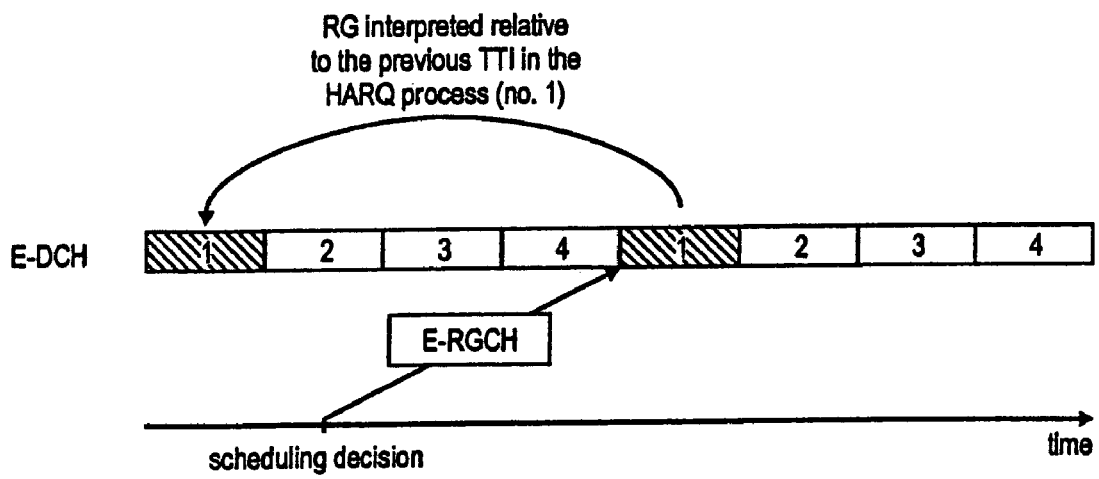
FIG. 10 shows the timing relation of relative grant.
Figure 11:
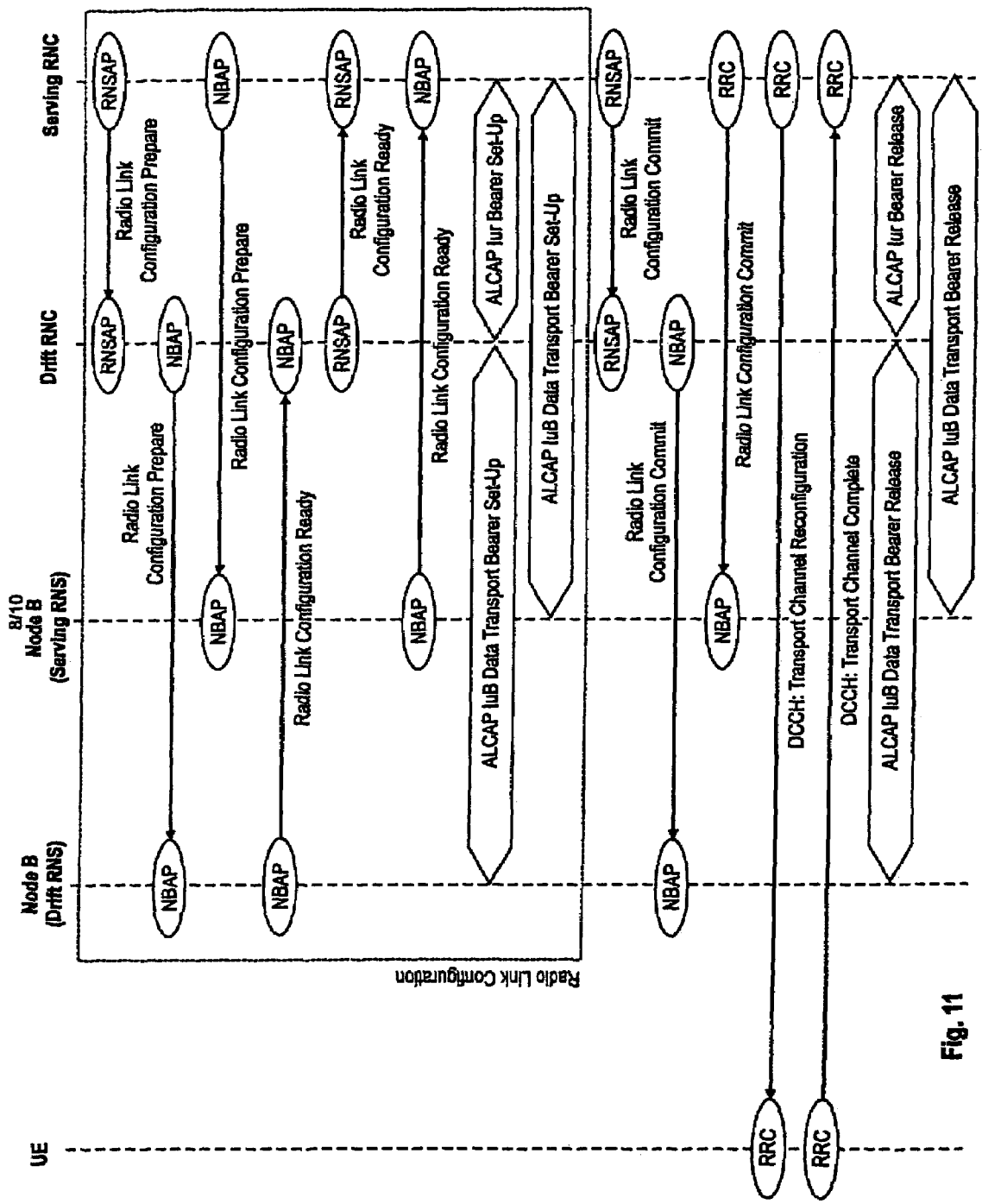
FIG. 11 shows a synchronized transport channel reconfiguration procedure in UMTS.
Figure 13:
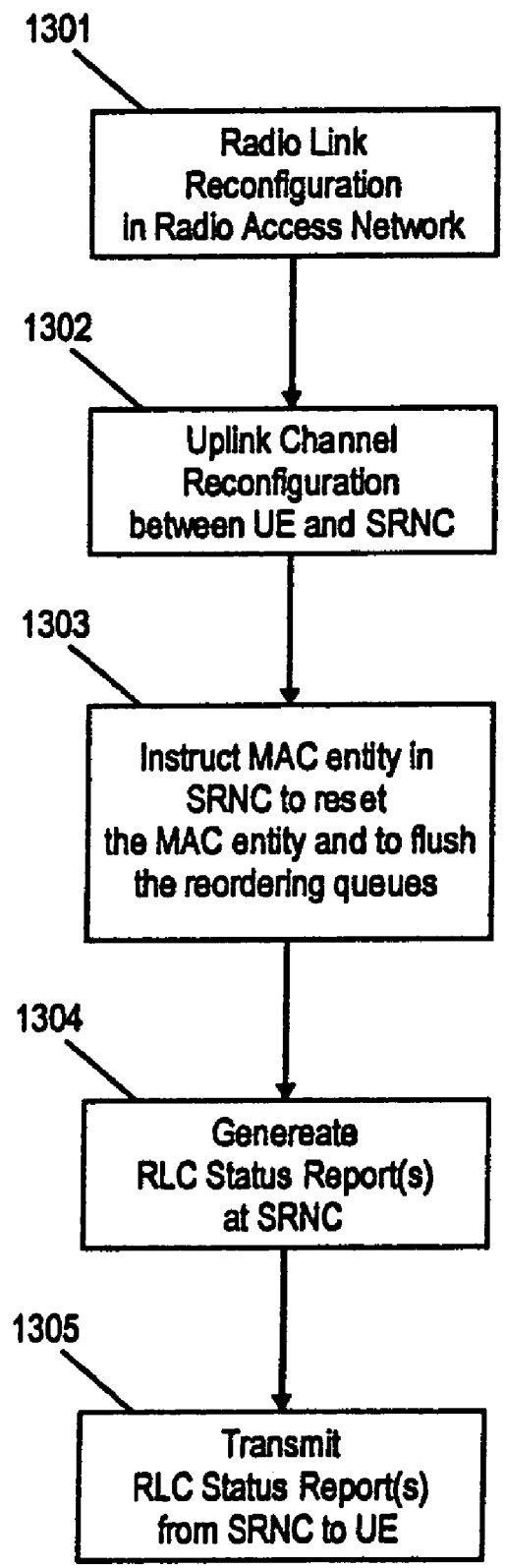
FIG. 13 shows flow chart illustrating the procedural steps of an uplink channel reconfiguration according to an embodiment of the invention.

Going back to FIG. 13, upon reconfiguration of the uplink channel, the network element terminating the RRC layer functionality towards the UE (e.g. S-RNC) may next instruct 1303 the MAC entity terminating the MAC layer towards the UE to reset the MAC entity in the S-RNC (MAC-es) by flushing the reordering queues of the previously configured HARQ processes. In response to the instruction, the Node B's MAC entity of the MAC layer may provide all PDUs presently stored in the reordering queues to the RLC entities of the RLC layer mapped to the uplink channel before flushing the reordering queues. Returning again to FIG. 12, this step 1303 may be for example implemented by sending 1207 a primitive, a so called CMAC-es Reset REQ (REQ=Request), from the RRC Layer of the S-RNC to the MAC-es entity of the MAC layer (see also FIG. 9). In response to the primitive, the MAC-es entity forwards all PDUs presently stored in the reordering queues to the respective RLC entities to which they are destined (not illustrated in FIG. 12). As can be seen in FIGS. 5 and 9, each logical channel providing a MAC-d flow multiplexed to the transport channel of the E-DCH is terminated by a RLC entity in the RLC layer. Accordingly, on the receiving side, the MAC-e entity—which is commonly located in a Node B—demultiplexes the PDUs and provides same to the MAC-es entity—which is commonly provided in the S-RNC—for distributing the PDUs via the MAC-d flows to the respective RLC entities mapped to the transport channel of the E-DCH. Going back to FIG. 13 again, status reports indicating the successfully received PDUs or the unsuccessfully received PDUs are generated 1304 at each RLC entity mapped to E-DCH and the status reports are transmitted 1305 to the UE. To identify individual PDUs, same may carry a sequence number in the RLC header, as for example illustrated in FIG. 5.

Returning to FIG. 12, these steps may be implemented as follows in a UMTS system. Upon having forwarded the PDUs to the RLC entities mapped to the E-DCH, the MAC layer may communicate 1208 another primitive to the RLC layer instructing all RLC entities mapped to the uplink channel to generate a status report and to transmit the status report to the UE within a RLC Status Reports 1209. In order to instruct the MAC-es entity to forward the PDUs of the reordering buffer to the RLC entities mapped to the uplink channel, some mechanism has to be introduced to the operation of the S-RNC. For example, the RRC layer may inform the MAC-es entity of the MAC layer to reset the reordering buffer and deliver the stored packets to RLC layer via a primitive. In case the status reports are generated before the stored PDUs in the reordering buffer are delivered to the RLC entities, however, some RLC PDUs may be incorrectly indicated as not being received, which would result in unnecessary RLC retransmissions.

Therefore, it is advantageous to ensure that all PDUs have been delivered to the RLC entities and have been processed by same before generating the status report, in order to obtain the correct status of all received PDUs.

The S-RNC operation according to the exemplary embodiment of the invention shown in FIG. 12 may be summarized as follows:

MAC-es is informed to reset the reordering buffer and flush all stored PDUs by a primitive from RRC MAC-es delivers all stored PDUs from each reordering queue to higher layers MAC-es indicates after flushing of the reordering queues to all RLC entities mapped on E-DCH and operated in acknowledged mode (AM) to generate a status report Each RLC entity mapped on E-DCH and operating in AM generates a RLC status report and transmits a Control PDU, comprising the status report to the UE When implementing the embodiment of the invention in a UMTS system, however the autonomous generation of the RLC status reports after TTI reconfiguration may be prohibited by the STATUS_Prohibit_Timer, as explained previously. Therefore, a further embodiment of the invention suggests that the network element, i.e. the S-RNC in the present example, is allowed even if the STATUS_Prohibit_Timer is not expired. Thus, the status report from the RLC entities mapped to the uplink channel are generated and transmitted upon reconfiguration of the uplink channel without considering the STATUS_Prohibit_Timer.

Next, some aspects of the UE operation upon uplink channel reconfiguration will be described. Upon reconfiguration of the TTIs of the uplink channel, i.e. the E-DCH in this exemplary embodiment, the UE may optionally reset the transmission sequence number (TSN) for the next transmission of MAC-es PDUs on every HARQ process after the TTI reconfiguration has been done (TSN: compare also FIG. 5). For example, one TSN setting process at the UE for each logical channel is performed. The UE operation in support of the re-ordering functionality consists in generating an explicit sequence number (TSN) for each MAC-es PDU intended for the associated re-ordering queue. Each TSN setting process maintains the state variable CURRENT_TSN, which indicates the sequence number to be included in the header of the following MAC-es PDU to be generated. When the TSN setting process is established, the state variable CURRENT_TSN is reset to an initial value, which is commonly 0.

When a new payload needs to be generated for the associated re-ordering queue, the re-ordering entity sets the TSN of the transmission to CURRENT_TSN. At the end of a TTI for which at least one MAC-es PDU was transmitted the state variable CURRENT_TSN may be incremented by 1, and is reset to the initial value upon reaching the maximum number representable by the number of bits available for representing the TSN (wrap-around). For example assuming a 6 bit TSN, if state variable CURRENT_TSN exceeds 63 it is reset to 0 again. In this embodiment each TSN setting process may be reset upon reconfiguration of the TTI of the E-DCH transport channel.

In order to allow for an efficient recovery of the lost PDUs due to the TTI reconfiguration the RLC entity in UE should obtain an accurate status report with a minimal delay after the TTI reconfiguration.

As indicated previously, according to one exemplary embodiment of the invention a RLC entity mapped to uplink channel in the S-RNC may generate a RLC status report autonomously upon TTI reconfiguration and transmits the status report to the transmitting entity, which resides in the UE.

Another embodiment of the invention is essentially similar to the embodiments described with respect to FIG. 12 and FIG. 13 above. In this embodiment of the invention, the generation and transmission of the status reports is triggered by the UE instead of the S-RNC in response to the uplink channel reconfiguration (see step 1302 of FIG. 13) As already outlined before the RLC transmitting entity, which resides in UE for uplink transmissions, can poll a RLC status report from the peer receiving RLC entity (SRNC). There are several triggers for the polling of RLC status reports defined. As discussed in the Technical Background section, none of the triggering events is aligned with a possible TTI reconfiguration. However it may be beneficial having the status report of the missing PDUs with minimal delay following a TTI reconfiguration.

For this purpose, according to this exemplary embodiment of the invention, a new trigger for polling a status report is introduced. The UE polls a status report from each RLC entity mapped to uplink channel when the uplink channel reconfiguration has been performed, e.g. after activation time indicated in the transport channel reconfiguration message from the RRC (see step 1205 in FIG. 12). According to a further embodiment of the invention, the polling upon TTI reconfiguration is also not be prohibited by mechanisms like the poll_prohibit_timer. As explained in the Technical Background section, the poll_prohibit_timer can be implemented to solve the problem of excessive polling and status report transmission.

After the transport channel reconfiguration complete message is transmitted 1206 in FIG. 12 from UE to the SRNC via RRC signaling, the UE may trigger a poll for each RLC entity mapped on uplink channel. This solution would have no impact on the current UMTS specifications, apart from the definition of a new triggering event. On the downside, this implementation may not be the most efficient one from delay point of view. UE has to wait for the transmission of a RLC PDU from entities, which are mapped on E-DCH after the transport channel reconfiguration complete message was transmitted. In these RLC layer PDUs the UE may set the poll bit in order to request a RLC status report from the peer receiving RLC entity. Upon reception of the poll bit the receiving RLC entity will generate a status report and send it to the transmitting entity in UE.

In order to reduce the delay for the generation of status reports, another embodiment of the invention suggests that polling for a RLC status report is be included in the transport channel reconfiguration complete message by UE after uplink channel reconfiguration was done. For example, a new IE may be introduced in this RRC signaling message which indicates to the RRC entity in S-RNC to request each RLC entity in acknowledged mode and being mapped to E-DCH to generate and transmit a status report. For example, this new IE may comprise a one bit flag.

Upon reception of the transport channel reconfiguration complete message at the S-RNC, RRC may determine whether the flag in the IE is set. In case the flag is set RRC informs the RLC entities via a primitive to generate a RLC status report. The inclusion of the poll bit in the transport channel reconfiguration complete message may be advantageous in terms of delay, since the polling is done with the first message after the reconfiguration was done.

Another aspect according to a further embodiment of the invention is the handling of HARQ process restrictions at the UE side upon an uplink channel reconfiguration. In a UMTS system there are typically two types of data transmissions on the E-DCH as an exemplary uplink channel, scheduled and non-scheduled transmissions. For scheduled data transmissions UE needs a valid scheduling grant before transmitting data on E-DCH. The usual procedure implies that UE sends a rate request to the serving Node B, by means of either scheduling information or happy bit, and upon reception of the rate request serving Node B will allocate uplink resources by means of scheduling grants, i.e. absolute and relative grants, to the UE. One Scheduling Grant (SG) is maintained in both the UE and the RAN through AG/RG signaling. When a HARQ process is active, the value of the Scheduling Grant is taken into account in E-TFC selection. When a process is inactive, the UE is not allowed to transmit in this HARQ process. There are two HARQ process Activation/Deactivation mechanisms in E-DCH. In the Layer 3-meachnism of the RRC layer, for example a string of 8 bits, each bit representing a HARQ process, for the 2 ms TTI case defines which processes are active and which are not. A logical "1" indicates that the HARQ process is active, whereas a "0" indicates that no uplink transmission of scheduled data is allowed in this specific HARQ process.

The Layer 2-mechanism provides a very fast HARQ process activation mechanism by means of absolute grant signaling. The HARQ process activation flag on the absolute grant channel (E-AGCH) defines whether the absolute grant is valid for only one HARQ process, which is determined by the timing relation as explained before, or for all HARQ processes. In case the Absolute grant value is "INACTIVE" and the HARQ process activation flag is set to "Per HARQ process", the HARQ Process given by the timing relation of the absolute grant signaling is deactivated. UE is not allowed to send scheduled data in this HARQ process. In order to activate a HARQ process, Node B sends an absolute grant with HARQ process activation flag set to "Per HARQ process" and an absolute grant value different from "INACTIVE". This activates the HARQ process indicated by the timing relation of the absolute grant channel signaling.

By the Layer2 mechanism scheduling Node B is provided a fast mechanism to activate/deactivate HARQ processes for scheduled data transmission. This enables in turn scheduling Node B to better control the uplink interference in the cell.

According to the embodiment of the invention, it is proposed that upon uplink channel reconfiguration, the UE resets the HARQ process restriction that have been previously defined by either one of the Layer 2 or Layer 3 process restriction mechanism described above. Hence, after a reconfiguration of the uplink channel all available HARQ processes may be used for the transmission of scheduled data in the uplink. This reset of the HARQ process restriction may be implemented independent from whether the uplink reconfiguration has changed the number of available HARQ processes, as for example in when a TTI reconfiguration is performed, or the uplink reconfiguration has not changed the number of available HARQ processes. The activation of the new configured HARQ processes upon uplink reconfiguration may avoid additional control signaling from the URTAN for (re)activating previously deactivated processes.

A further aspect of the invention is the advantageous use of the MAC entity reset or reconfiguration described above upon a UE entering into soft handover. When entering soft handover among different radio cells, according to a further embodiment, the transmission time interval for transmissions on the uplink and thereby the number of HARQ processes is changed. For example, prior to entering soft handover, the uplink channel towards the "old" Node B, to which the UE is presently connected, may be reconfigured setting the TTI to be used during soft handover. Further, the uplink to the "new" added Node B in the active set, to which the UE may be handed over, is established thereby configuring the correct TTI and number of HARQ processes. Similarly, upon releasing a radio link, i.e. uplink channel, towards the "old" Node B, the established uplink connection towards the new Node B may be reconfigured again changing the TTI to be used for uplink transmissions and thereby the number of HARQ processes. Hence, upon each of these TTI reconfigurations, the RLC layer entities mapped to the uplink channel may generate and transmit RLC status reports to the UE as described in the various embodiments of the invention above.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Some of the embodiments of the invention described herein may allow for providing efficient and fast generation of status reports after an uplink channel reconfiguration. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A transmission apparatus comprising:
   a sequence number setting section operable to set a transmission sequence number for a protocol data unit of a logical channel, the logical channel being mapped to an uplink transport channel, and
   a transmission section operable to transmit the protocol data unit for which the transmission sequence number is set on the uplink transport channel configured with a transmission time interval,
   wherein said sequence number setting section is operable to reset the transmission sequence number in case that the transmission time interval of the uplink transport channel is reconfigured.

2. The transmission apparatus according to claim 1, wherein the uplink transport channel is an enhanced uplink dedicated channel.

3. The transmission apparatus according to claim 1, wherein said transmission sequence number setting section and said transmission section are part of a MAC (Medium Access control) layer in the transmission apparatus.

4. The transmission apparatus according to claim 1, wherein the uplink transport channel is configured with either 2ms transmission time interval or 10 ms transmission time interval.

5. The transmission apparatus according to claim 4, wherein said sequence number setting section is operable to reset the transmission sequence number in case that the transmission time interval is changed from 2 ms to 10 ms or vice versa.

6. The transmission apparatus according to claim 1, wherein said sequence number setting section is operable to reset the transmission sequence number to 0.

7. The transmission apparatus according to claim 1, wherein said sequence number setting section is operable to reset the transmission sequence number for all logical channels mapped to the uplink transport channel.

8. The transmission apparatus according to claim 1, wherein said sequence number setting section is operable to reset the transmission sequence number after the transmission time interval is reconfigured.

9. The transmission apparatus according to claim 1, wherein said transmission section is operable to transmit the protocol data unit utilizing a HARQ (Hybrid Automatic Repeat Request) process.

10. The transmission apparatus according to claim 9, wherein the transmission apparatus is operable to flush the HARQ process in case that the transmission time interval is reconfigured.

11. The transmission apparatus according to claim 1, wherein said sequence number setting section is operable to set the transmission sequence number per logical channel mapped onto the uplink transport channel for each protocol data unit.

12. The transmission apparatus according to claim 1, wherein said sequence number setting section is operable to set the transmission sequence number for the protocol data unit to support re-ordering functionality at a receiving apparatus.

13. The transmission apparatus according to claim 1, wherein the transmission sequence number is used for reordering purposes to support in-sequence delivery of a protocol data unit to higher layers.

14. The transmission apparatus according to claim 1, wherein the transmission apparatus is operable to use a transport channel reconfiguration procedure for reconfiguring the transmission time interval.

15. The transmission apparatus according to claim 14, wherein the transport channel reconfiguration includes a reset of MAC (Medium Access Control) entity.

16. The transmission apparatus according to claim 1, wherein said sequence number setting section is operable to reset the transmission sequence number in case that a transport channel reconfiguration is requested.

17. The transmission apparatus according to claim 1, wherein said sequence number setting section is operable to reset the transmission sequence number in case that a transport channel reconfiguration followed by a reset of MAC entity is requested by higher layer.

18. The transmission apparatus according to claim 1, wherein the protocol data unit is a MAC-es PDU (Medium Access Control-as Protocol Data Unit).

19. The transmission apparatus according to claim 1, wherein said sequence number setting section is operable to increment the transmission sequence number by 1 at the end of the transmission time interval for which at least one protocol data unit is transmitted.

20. The transmission apparatus according to claim 1, wherein the transmission sequence number is included in a header of the protocol data unit.

21. The transmission apparatus according to claim 1, wherein said sequence number setting section is operable to reset the transmission sequence number if the current transmission sequence number exceeds a maximum number.

22. A mobile terminal equipped with the transmission apparatus according to claim 1.

23. A method for transmitting data comprising:
   setting a transmission sequence number for a protocol data unit of a logical channel, the logical channel being mapped to an uplink transport channel,
   transmitting the protocol data unit for which the transmission sequence number is set on the uplink transport channel configured with a transmission time interval, and
   resetting the transmission sequence number in case that the transmission time interval of the uplink transport channel is reconfigured.

24. The method according to claim 23, wherein the uplink transport channel is an enhanced uplink dedicated channel.

25. The method according to claim 23, wherein the uplink transport channel is configured with either 2 ms transmission time interval or 10 ms transmission time interval.

26. The method according to claim 25, wherein the sequence number is reset in case that the transmission time interval is changed from 2 ms to 10 ms or vice versa.

27. The method according to claim 23, wherein the transmission sequence number is reset to 0.

28. The method according to claim 23, wherein the transmission sequence number is reset for all logical channels mapped to the uplink transport channel.

29. The method according to claim 23, wherein the transmission sequence number is reset after the transmission time interval is reconfigured.

30. The method according to claim 23, wherein the protocol data unit is transmitted utilizing a HARQ (Hybrid Automatic Repeat Request) process.

31. The method according to claim 30, further comprising flushing the HARQ process in case that the transmission time interval is reconfigured.

32. The method according to claim 23, wherein the transmission sequence number is set per logical channel mapped onto the uplink transport channel for each protocol data unit.

33. The method according to claim 23, wherein the transmission sequence number is set for the protocol data unit to support re-ordering functionality at a receiving apparatus.

34. The method according to claim 23, wherein the transmission sequence number is used for reordering purposes to support in-sequence delivery of a protocol data unit to higher layers.

35. The method according to claim 23, further comprising reconfiguring the transmission time interval.

36. The method according to claim 23, wherein the transmission time interval is reconfigured in a transport channel reconfiguration procedure.

37. The method according to claim 36, wherein the transport channel reconfiguration includes a reset of a MAC (Medium Access Control) entity.

38. The method according to claim 23, further comprising receiving a request for a transport channel reconfiguration, wherein the transmission sequence number is reset in case that the request for a transport channel reconfiguration is received.

39. The method according to claim 23, further comprising:
receiving a request for a transport channel reconfiguration followed by a reset of a MAC (Medium Access Control) entity, wherein the transmission sequence number is reset in case the request for the transport channel reconfiguration followed by a reset of the MAC entity is requested by higher layer.

40. The method according to claim 23, wherein the protocol data unit is a MAC-es PDU (Medium Access Control-es Protocol Data Unit).

41. The method according to claim 23, further comprising the step of incrementing the transmission sequence number by 1 at the end of the transmission time interval for which at least one protocol data unit is transmitted.

42. The method according to claim 23, wherein the transmission sequence number is included in a header of the protocol data unit.

43. The method according to claim 23, further comprising resetting the transmission sequence number if the current transmission sequence number exceeds a maximum number.

44. A mobile terminal operable to perform the method for transmitting data according to claim 23.

45. A computer-readable medium storing instructions that, when executed by the processor of a transmission apparatus, cause the transmission apparatus to perform the method according to claim 23.

46. A computer-readable medium storing instructions that, when executed by a processor of a transmission apparatus, cause The transmission apparatus to transmit data by:
setting a transmission sequence number for a protocol data unit of a logical channel, the logical channel being mapped to an uplink transport channel,
transmitting the protocol data unit for which the sequence number is set on the uplink transport channel configured with a transmission time interval, and
resetting the transmission sequence number in case that the transmission time interval of the uplink transport channel is reconfigured.

* * * * *